US012684346B2

(12) United States Patent
Zeh et al.

(10) Patent No.: US 12,684,346 B2
(45) Date of Patent: Jul. 14, 2026

(54) SECURED ACCESS TO IN-VEHICLE END NODES AND WAYS TO ENHANCE VEHICLE FUNCTIONALITY

(71) Applicant: Infineon Technologies AG, Neubiberg (DE)

(72) Inventors: Alexander Zeh, Munich (DE); Thomas Liebetrau, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 467 days.

(21) Appl. No.: 18/333,183

(22) Filed: Jun. 12, 2023

(65) Prior Publication Data

US 2024/0414527 A1     Dec. 12, 2024

(51) Int. Cl.
*H04W 12/041*     (2021.01)
*H04W 12/06*     (2021.01)

(52) U.S. Cl.
CPC ......... *H04W 12/041* (2021.01); *H04W 12/06* (2013.01)

(58) Field of Classification Search
None
See application file for complete search history.

(56) References Cited

U.S. PATENT DOCUMENTS

| | | |
|---|---|---|
| 2013/0159586 A1 | 6/2013 | Kessler |
| 2019/0223010 A1* | 7/2019 | Keränen ............... H04W 80/12 |
| 2021/0136051 A1* | 5/2021 | Kim ........................ H04W 4/48 |

FOREIGN PATENT DOCUMENTS

| | | |
|---|---|---|
| EP | 3349514 B1 | 5/2020 |
| WO | 2020150872 A1 | 7/2020 |

OTHER PUBLICATIONS

Ariel Shiftan: "Key Rotation Strategies for Securing Sensitive Data", May 23, 2023 (May 23, 2023), XP093197865, Retrieved from the Internet: URL:https://www.piiano.com/blog/key-rotation.
Invitation to pay additional fees and Partial Search Report for Application No. PCT/EP2024/066157, Oct. 8, 2024, 10 pages.
Parikh, N., et al., "Privacy-preserving Services in VANET with Misbehavior Detection", IEEE International Conference on Advanced Networks and Telecommunications Systems (ANTS), IEEE, 1, Dec. 2017 (Dec. 17, 2017), pp. 1-6, XP033358602, DOI: 10.1109/ANTS. 2017.8384146 [retrieved on Jun,. 12, 2018].
Rescorla, E., "The Transport Layer Security (TLS) Protocol Version 1.3", Internet Engineering Task Force (IETF), Request for Comments: 8446, Obsoletes: 5077, 5246, 6961, Updates: 5705, 6066, Category: Standards Track, Aug. 1, 2018 (Aug. 1, 2018), XP055863908, Retrieved from the Internet: URL:https://www.rfc-editor.org/rfc/pdfrfc/rfc8446.txt.pdf [retrieved on Nov. 22, 2021].
Saeed, M.E., et al., "AKAIoTs: authenticated key agreement for Internet of Things," Wireless Networks, vol. 25, pp. 3081-3101 (2019), XP036802216, ISSN: 1022-0038, DOI: 10.1007/S11276-018-1704-5 [retrieved on Mar. 10, 2018].

(Continued)

*Primary Examiner* — Frantz Bataille
(74) *Attorney, Agent, or Firm* — Harrity & Harrity, LLP

(57)     ABSTRACT

The present disclosure relates to an in-vehicle network end node and secure ways for the in-vehicle end node to access a server in order to off-load complex tasks from the in-vehicle end node thereby enhancing its function despite the scarce resources of the in-vehicle end node.

48 Claims, 15 Drawing Sheets

(56) References Cited

OTHER PUBLICATIONS

Samuel, H., et al., "Preventing Unauthorized Messages and Achieving End-to-End Security in Delay Tolerant Heterogeneous Wireless Networks", Journal of Communications, vol. 5(2), Feb. 2010, pp. 152-163, XP055152994, ISSN: 1796-2021, DOI: 10.4304/jcm.5.2. 152-163.

International Search Report and Written Opinion for Application No. PCT/EP2024/066157, mailed on Dec. 10, 2024, 23 pages.

Odhiambo, M.C., et al., "Packet VOIP Aggregation: A Mechanism to Improve the Performance of VoIP in Wireless Mesh Networks (WMNS)", Mar. 4, 2015, XP093229330, Retrieved from the Internet: URL:https://www.researchgate.net/publication /283489719_ Packet_VoIP_Aggregation_A_Mechanism_to_Improve_the_ Performance_of_VoIP in_Wireless_Mesh_Networks_WMNS.

* cited by examiner

Packing preprocessed server payload (SP) as sequence of SDPs — 1200

Flagging selected SDPs — 1210

Establishing a secret (S1Re) or derived key (KiS1Re) between server S1 and relay (Re) — 1220

Establishing FV details — 1230

1240

1245

Authentication only

Authentication and encryption

Recognizing server error/server control messages — 2350

Pausing forwarding individual data packets — 2352

Causing a relay action to server error/ server control message — 2354

Indicating completion of relay action — 2356

Resuming forwarding — 2358

SECURED ACCESS TO IN-VEHICLE END NODES AND WAYS TO ENHANCE VEHICLE FUNCTIONALITY

FIELD

The present disclosure relates to an efficient way to enhance functionality of in-vehicle end nodes within a vehicle fleet. In this regard, an efficient deployment of larger, and at scale available capabilities of a server external to the vehicles is disclosed in order to provide unprecedented functional and customization services within the vehicle fleet.

BACKGROUND

In a typical vehicle, functionality available was exclusively designed by the manufacturer and in most cases this functionality was fixed over lifetime, with the vehicle leaving the manufacturing plant. With vehicles becoming more connected and software defined, classical vehicle manufacturers struggle to keep pace with the increasing complexity that digital services related to software and connectivity bring, while craving for differentiation over competition.

SUMMARY

In some implementations, an in-vehicle end node includes one or more memories; and one or more processors, communicatively coupled to the one or more memories, configured to: participate in an in-vehicle network of a vehicle; establish a secret, between the in-vehicle end node and a server, the server being external to the vehicle and forming part of a server network, the server network being of a server network type different to the in-vehicle network, wherein the server is communicatively coupled to the in-vehicle end node via at least one relay, the at least one relay communicatively couplable to the server and further participating in the in-vehicle end network; establish a secured end-to-end communication between the end node and the server using the secret or a first key derived from the secret; and communicate one or more end node data packets of an end node packet size via the secured end-to-end communication to the server.

In some implementations, a method of operating an in-vehicle end node includes coupling the in-vehicle end node to an in-vehicle network; establishing a secret between the end node and a server, the server being external to the vehicle and participating in a server network of a different type than the in-vehicle network; establishing a secured end-to-end communication between the end node and the server; and transmitting one or more end node data packets of an end node packet size via the secured end-to-end communication to the server via a relay.

In some implementations, a relay comprising: one or more memories; and one or more processors, communicatively coupled to the one or more memories, configured to: receive a sequence of server data packets from a server participating in a server network type, wherein the relay is configured to be couplable to the server, wherein the relay is configured to be couplable to an in-vehicle network of an in-vehicle network type that is different from the server network type, and one or more in-vehicle network end nodes participating in the in-vehicle network and communicatively couplable to the relay, wherein an individual one of the server data packets of the sequence of server data packets comprises a number of end node data packets, the number of end node data packets being usable within the in-vehicle network, and wherein the end node data packets are of an end node packet size smaller than a server data packet payload; and forward the number of end node data packets to the in-vehicle network.

In some implementations, a method of relaying includes coupling to a server network; coupling to an in-vehicle network; receiving one or more server data packets, an individual one of the server data packets comprising a number of end node data packets, the number of end node data packets being usable within the in-vehicle network, wherein the end node data packets are of an end node packet size smaller than a server data packet payload; and forwarding individual node data packets as received within the received one or more server data packet to the in-vehicle network.

In some implementations, a device for controlling a server includes one or more memories; and one or more processors, communicatively coupled to the one or more memories, configured to: couple to the server within a server network; cause the server to preprocess a server payload into a sequence of node data packets of an end node packet size; cause the server to communicate the server payload to the one or more in-vehicle network end nodes via at least one relay, wherein the server payload is communicated to the at least one relay as a sequence of server data packets, wherein an individual server data packet out of the sequence of server data packets comprises a number of end node data packets out of the sequence of end node data packets, the number of end node data packets in line with a server packet size, wherein the one or more end nodes are couplable to the relay via an in-vehicle network in which the relay participates, and wherein the node data packets may be directly communicated within the in-vehicle network.

In some implementations, a method of controlling a server includes coupling a device to the server; causing the server to preprocess a server payload into a sequence of node data packets of an end node data packet size; causing the server to pack the preprocessed server payload as a sequence of server data packets, wherein an individual server data packet out of the sequence of server data packets comprises a number of subsequent end node data packets out of the sequence of end node data packets, the number of subsequent end node data packets being in line with the server packet size; and causing the server to communicate the sequence of server data packets to the relay.

BRIEF DESCRIPTION OF THE DRAWINGS

Sample implementations are described herein referring to the appended drawings.

FIG. 1 illustrates an overview for systems that the present disclosure relates to.

DETAILED DESCRIPTION

The present disclosure illustrates how third-party suppliers could deal with a manufacturer's struggle providing services to vehicles of a fleet in an efficient and secure manner.

Figure 1:
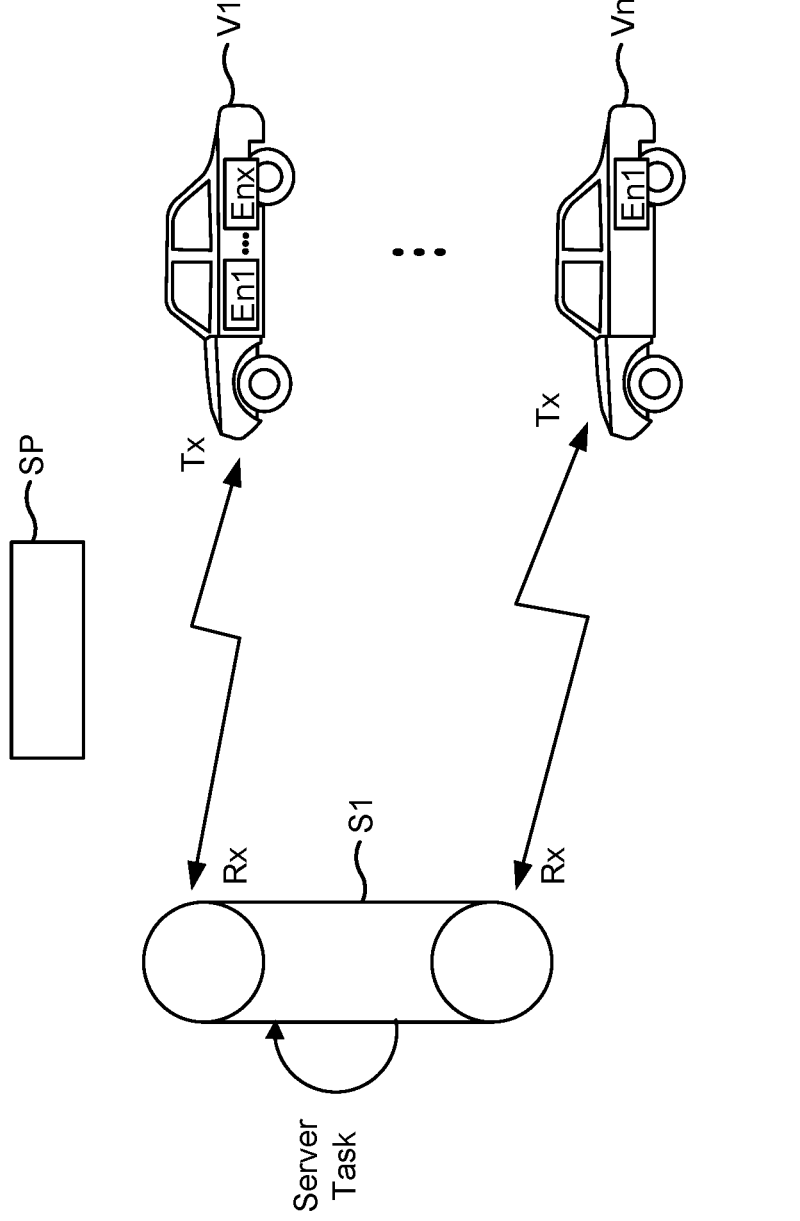

FIG. 1 illustrates a situation that the present disclosure sets out to address. A server S1 is located outside a fleet of vehicles V1, . . . , Vn. The server S1 may communicate with the vehicles as indicated by the arrows Tx, each pointing towards an individual one Vi of the vehicles V1, . . . , Vn.

One way to alter or enhance functionality available in the vehicles V1, . . . , Vn is to update software running on computing devices, such as a relay as in a relay network, a central car computer, or an end point electronic control unit (ECU). This disclosure contemplates updating software running on end nodes of in-vehicle networks (IVNs) as a first option to enhance functionality of end nodes.

An in-vehicle end node, or just end node, may be configured to control an actuator. Alternatively, an end node may measure physical operational parameters using a variety of sensors. It is convenient to have individual end nodes coupled to an in-vehicle network IVN. End nodes are optimized for their purpose and may have rather scarce resources when it comes to compute power, memory, communication interfaces, and the like as such resources would add costs and complexity to the end nodes.

Let us consider an actuator first: it is a device causing a certain actuation, like a brake command to cause the vehicle to slow down in a controlled manner. Such actuation is frequently related to driving functionality, think of steering, braking, motor control for an electrical main drive, or headlight operation. Quite often, actuator functionality is related to a driving state of a vehicle and is, therefore, time critical, just think of a steering or braking actuation in response to some sensor information.

It is of interest to make sure a latency for an actuation command is deterministic. This is to say, it takes a predictable time, until the actuator command routed through the IVN arrives at the end node.

For an end node measuring a physical quantity or an operational parameter of a subsystem of the vehicle, the scenario is similar. Think of an end node controlling one or more anti-lock breaking system (ABS) sensors measuring a wheel speed. We need the speed signal to be measured at defined points in time. The wheel speed information may be used to trigger a braking command. And for this braking command we require the travelling time deterministic with low latency. The same holds for phase information of an electric motor measured by several sensors.

Given the scarce resources within end nodes, a software update as small as two megabytes might already be a challenge. The present disclosure addresses this challenge with a preprocessing of a server payload (SP)—namely the software update—on the server S1, such as to make the implementation of the software update on the end node less demanding in terms of memory requirements, communication overhead, or processing needs.

Enhancing functionality may be realized by adding complex functionality to end node devices En1, . . . , Enx. Given the scarce resources, one may want to consider shifting complex tasks enabling enhanced functionality from the end nodes En1, . . . , Enx to a server S1 with considerably higher compute power. Think of an artificial intelligence (AI) optimizing parameters of an in-cabin audio system in order to reduce unwanted resonances. The AI optimizing the parameters could be implemented as a server task as illustrated in FIG. 1.

This disclosure illustrates how enhanced functionality may be provided by third parties taking over tasks that would traditionally be in the realm of the vehicle manufacturer. Allowing third parties to modify vehicle functionality poses a risk of compromising the function and/or safety. Therefore, there is an interest to offer such access adequately secured. Under the same token services and solutions offered by third parties accessing the end nodes En1, . . . , Enx may enable a new level of customization of driver and passenger experience.

The communication between the server S1 and individual vehicles V1, . . . , Vn in FIG. 1 may involve a sequence of communication from the server S1 to an end node En within an individual vehicle.

Figure 2:
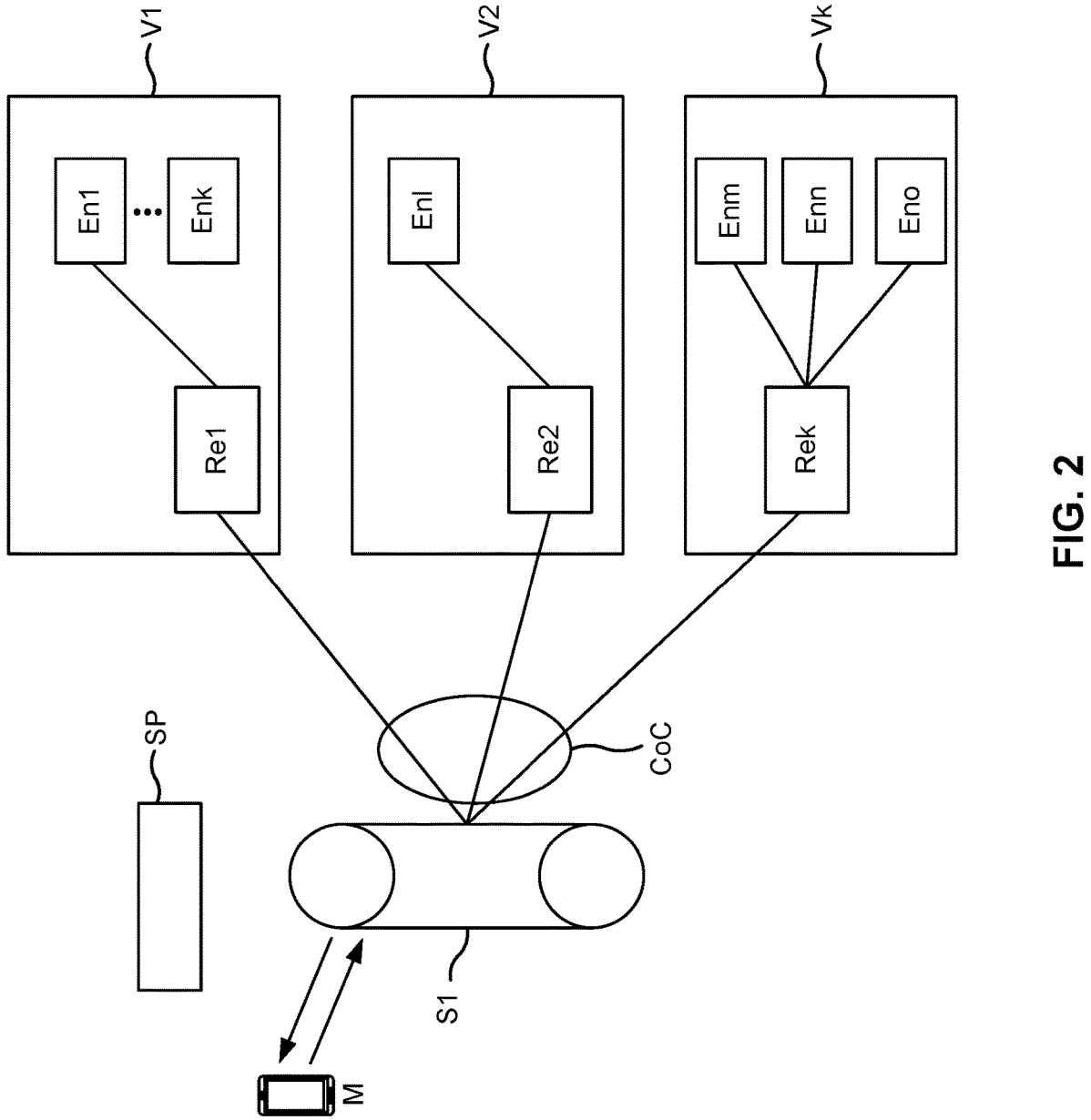
FIG. 2 illustrates distribution of server payload to end nodes of in-vehicle networks.

FIG. 2 illustrates a further element of scaling the benefits of the present disclosure when facing a vehicle fleet V1, . . . , Vn. In FIG. 1, all individual vehicles are individually addressed by the server S1. The present disclosure suggests however to group vehicles into a cohort V1, . . . , Vk of k vehicles that share a common characteristic (CoC). Such common characteristic may select end nodes of an identical type for an update with the server payload SP, as such end nodes would behave identically. A further alternative is to select end nodes En1, . . . , Enk connected or connectable to an identical IVN, as then end node data packets (NDPs)—also referred to as node data packets—are of an identical format. Conceivable IVN types are multidrop bus system, such as Flexray, CAN, CAN FD, CAN XL, LIN bus, and 10Base T1S, to give some examples. As yet another alternative, a functional state of the vehicles V1, . . . , Vk may be used as the common characteristic CoC. A functional state of the vehicle could be parking with ignition switched off, driving at a speed below 10 km/h, and the like. In another example, the common characteristic CoC could be a certain capability of end nodes, such as a capability, say an audio CODEC, a hardware accelerator for a specific task, say encryption or authentication, such as ASCON as one example for a lightweight cipher.

In FIG. 2, the vehicles V1, . . . , Vk are assumed to each have a relay (Re). An individual relay Re1, . . . , Rek couples the server S1 to the vehicles V1, . . . , Vk. A server network of a server network type (SN) in which the server S1 participates, may allow for payloads and server data packets (SDPs) to be considerably larger than those within the in-vehicle network IVN. Additionally, the server network may be of a different topology than the IVN. For example, the server network may be a point-to-point network, different to a multidrop network within the vehicle to give just one example. In yet another example, the end nodes may be selected according to membership in a secure zone within the IVN sharing a secret or a key derived from the secret to authenticate end node data packets NDPs or to authenticate and encrypt communication within the secure zone.

While FIG. 2 illustrates the server S1 outside the vehicle, it shall not be excluded from the present disclosure that the server S1 is also present within the vehicles V1, . . . , Vk.

In FIG. 2, relay Re1 couples to end node En1 within vehicle V1 according to the common characteristic CoC, while the other end nodes up to end node Enk within vehicle V1 are not coupled to the relay Re1. For vehicle V2, there is only end node En1 within vehicle V2 that meets the common characteristic CoC. For vehicle Vk, the relay Rek couples the server S1 to vehicle Vk. Further all end nodes Enm, Enn, and Eno are coupled to the relay Rk according to the common characteristic (CoC).

It will be appreciated that grouping of vehicles according to the common characteristic allows for an identical preprocessing of the server payload SP for distribution to end nodes. In the example of FIG. 2, these end nodes are En1, . . . , Enk within vehicle V1, end node En1 within vehicle V2, and end nodes Enm, Enn, and Eno within vehicle Vk. It is of interest to select a preprocessing at the server S1 such that node data packets NDP may be usable within the selected IVN. This is to say, that no further processing of node data packets is required either at the end nodes nor on the relay level, as will be explained in more detail below.

Optionally, there may also be a mobile device (M) communicatively couplable to the server S1, and thereby couplable to selected end nodes En1, . . . , Enm as shown in FIG. 2. The mobile device M may be used to control operation of the server S1. A user of the mobile device M may be given rights to trigger a certain server action, say communicating a server payload SP from the server S1 to the selected end nodes En1, . . . , Enm. Such server payload SP may represent a software update for the selected end nodes. Alternatively, or additionally, the server payload may represent one or more end node service requests (S1EnReqs). Such end node service request may cause the end node to perform an end node task, be it a measurement task, an actuation task, a reboot, or a control plane task, such as establishing security between the server S1 and the end node, or communicating a freshness value scheme corresponding to capabilities of the selected end node Eni.

Server action triggered by the mobile device M may include creating a situation as if one or more of the selected end nodes had triggered a server request. Likewise, the mobile device M may trigger an end node to inquire at the server S1, if a software update is available for the end node.

Depending on use case and access rights given to the user, the mobile device M may be configured to provide different functions. A person acting on behalf of a car manufacturer, or someone managing a large fleet of vehicles V1, . . . , Vk may use the mobile device M to trigger an update of software at end nodes En1, . . . , Enk selected according to a common characteristic CoC.

In contrast, suppose there is a service offered by a third party to a user of a vehicle to customize the driving experience further. One example could be to optimize an in-cabin audio experience of an entertainment system, or to improve voice recognition for a user. The third party offering such service could be given access to end nodes En1, . . . , Enk (see FIG. 2) controlling in-cabin microphones (not shown). For the improved in-cabin audio experience, a defined acoustic test signal may be played via in-cabin loudspeakers. The played test signal may be recorded using end nodes En1, . . . , Enk connected to several microphones distributed within the cabin.

For an improved voice recognition, the user would be presented a text being known to the voice recognition system, and asked to read it out aloud. His or her voice could then be recorded using end nodes En1, . . . , Enk to register the user's voice.

From the signal registered at the microphones, an application at the server S1 could establish an optimization of the audio in-cabin experience or improve voice recognition for the user running a service or some software on the server S1 providing an optimized parameter set based on the registered audio data. Such operations are also referred to as "server task" in FIG. 1.

It may further be of interest for the user to take the enhanced user experience by the third-party provider or the server S1 from one vehicle to another vehicle. In such a case, it is conceivable to provide parameters for an in-cabin lighting also for the other vehicle. This could be achieved by the server payload SP representing relevant service parameters to one or more end nodes En1, . . . , Enk within the other vehicle, as illustrated for vehicle V1 in FIG. 2. With such a transfer of enhanced functionality to the other vehicle, it might be required to repeat a server task using measurements taken within the other vehicle, as described above for the enhanced in-cabin audio experience or the optimized voice recognition.

Also, such transfer from one vehicle to another vehicle might conveniently be triggered by the mobile device M.

It will be appreciated that a level of security is of interest when giving third parties access to individual end nodes, say end nodes En1, . . . , Enk within vehicle V1 in FIG. 2. The present disclosure offers several levels of protection for a communication between the server S1 and individual end nodes Eni, . . . , Enk. It will be appreciated that communication between the server S1 and individual end nodes Eni, . . . , Enk may comprise a piece of information communicated from the server S1 to the end nodes En1, . . . , Enk or in fact a piece of information communicated from the end nodes En1, . . . , Enk to the server S1. The same holds when speaking of a piece of information communicated between the server S1 and end nodes.

One may choose to provide authenticity for communication between the server S1 and the end nodes communicating with the server according to the common characteristic CoC. Authenticity or authentication shall mean for this disclosure ways to prove that an individual piece of information communicated between the server and the end nodes is present at either party in an unaltered manner including an indication that this piece of information was in fact intended for a communication between server S1 and the end nodes selected according to the common characteristic CoC. Such a level of security may also be referred to as an authentication only mode.

As a higher level of data security, one might provide data security or confidentiality for communication between the server S1 and the individual end nodes En1, . . . , Enk in addition to the authentication described before. Such a level of communication may also be referred to as authentication and encryption mode.

In addition, one might be interested to prevent replay attacks for a piece of information communicated between server S1 and the end nodes selected according the common characteristic CoC. To this end, an individual piece of information communicated between the parties, may be attached a freshness value, as will be addressed in more detail with regards to FIG. 3.

Figure 3:
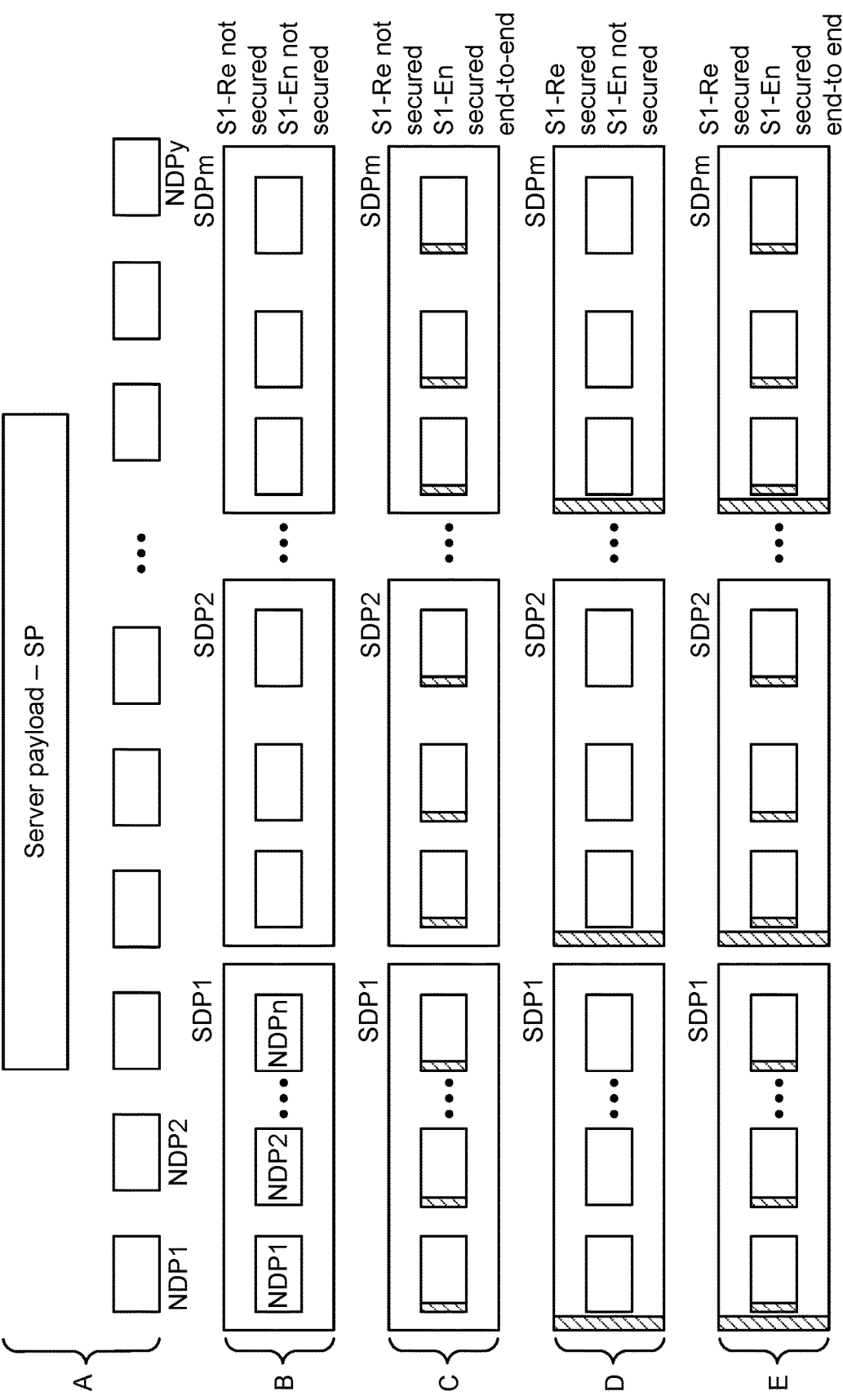
FIG. 3 illustrates a preprocessing of a server payload for distribution.

Turning to section A in FIG. 3, a native server payload SP is illustrated. This server payload SP may be an update of end node software to be communicated across a fleet of vehicles to end nodes according to a common characteristic CoC, say end nodes En1, . . . , Enk in vehicle V1 in FIG. 2.

Further, without limitation, the server payload SP may be the result of a server task performed by the server S1 in response to a user of the server requesting this task, a subscriber to the service requesting the server task, or a user of the mobile device M controlling the server S1, requesting the server task, or one or more end nodes selected according to the common characteristic (CoC) requesting the server tasks. It will be appreciated that there might be one or more end nodes requesting the server task.

SP may also entail a preprocessing of the payload taking into account some capabilities of the end nodes En1, . . . , Eno in FIG. 2 where the end nodes may be distributed over several vehicles V1, . . . , Vk of a vehicle fleet. If all the end nodes En1, . . . , Enk comprised an accelerator for a certain audio CODEC scheme, the native server payload SP could already reflect this audio CODEC.

It seems fair to assume that the server payload SP is too large to be delivered within one node data packet NDP from the server S1 via the relay Re1 to the end nodes En1, . . . , Enk. However, such circumstance shall not be excluded and in such circumstances a sequence of node data packets NDPs will be reduced to a single node data packet NDP1.

It might even be fair to assume that the server payload SP is even too big to be delivered within one individual server data packet SDPi. Without limitation however, there might be cases where the complete server payload SP can be delivered as one server data packet SDP1 and the sequence of server data packets SDP1, . . . , SDPm will be reduced to the server data packet SDP1 comprising in the extreme case only one node data packet NDP1, the only node data packet in this case representing the whole server payload.

In section A of FIG. 3, a sequence of end node data packets NDP1, . . . , NDPy represents the server payload SP distributed into a sequence or stream of end node data packets. The number of end node data packets NDP1, . . . , NDPy required to represent the server payload depends on a ratio of a size of the server payload to a node data packet payload as a first estimate. If a portion of the end node payload was needed to organize communication within the in-vehicle end node network, available payload per individual NDP may be reduced and additional NDPs may be needed to represent the native server payload SP.

It will be appreciated that the sequence of node data packets NDP1, . . . , NDPy can directly be communicated within the in-vehicle network IVN. We may refer to this property of the sequence of end node data packets NDP1, . . . , NDPy or of an individual node data packet NDPi as usable useful or "directly useful" within the in-vehicle network IVN. In other words, the individual node data packets NDPi are of a format to be communicated within the IVN. Therefore, the end nodes as well as the relay may directly process the node data packet NDPi without any repacking or the like.

An alternative way of looking at the node data packet being directly usable within the IVN is to say that no processing of end node data packets reaching the IVN side of the relay is required, namely the portion communicatively coupling to the in-vehicle network IVN. This reduces efforts needed at the relays Re1, . . . , Rek relaying the server payload SP grouped in the sequence of node data packets NDPs to the in-vehicle network IVN. In a way, the relays Re1, . . . , Rek are not acting like an entity that is busy repacking incoming data packets of a first size into a stream of outgoing data packet of a different size.

It seems further reasonable to assume that NDPs may travel a first portion of their way reaching the end nodes via a server network. The server S1 couples to the server network. The relays Re1, . . . , Rek may participate in the server network and are therefore couplable to the server network and hence the server S1. As mentioned before the relays Re1, . . . , Rek may further participate in the in-vehicle network and an individual relay may therefore be couplable to some end nodes within a given vehicle.

Section B of FIG. 3 shows a number of node data packets NDP1, . . . , NDPm being grouped into an individual server data packet SDPi (directly) usable within the server data network. Section B illustrates three node data packets NDP1, NDP2, and NDPn being grouped into the first server data packet SDP1. The number of node data packets that may be grouped into the individual server data packet SDPi depends on a ratio of node data packet size to a server data packet payload size. There may be additional communication overhead required due to the grouping of end node data packets which may affect the number of end node data packets that NDP1, . . . , NDPn grouped into the individual server data packets SDP1, . . . , SDPm.

For the example of section B, the native server payload SP represented as the sequence of node data packets NDP1, . . . , NDPy is grouped into a sequence of server data packets SDP1, . . . , SDPm. This grouping of section B does not provide any authenticity, security, or replay protection, yet.

Section C of FIG. 3 introduces a first level of security for the server payload SP being communicated to the end nodes selected according to the common characteristic CoC. It will be appreciated that in section C a hatched portion is displayed for individual node data packets NDP1 . . . , NDPn within an individual server data packet SDPi out of the sequence of server data packets SDP1, . . . , SDPm.

The hatched portion of end node data packets NDP1, . . . NDPn shall illustrate a level of security on an end node data packet level for the individual node data packet NDPi. It shall however not be mistaken as an additional header. Rather, it is intended to indicate a level of security for the whole node data packet NDP1, . . . , NDPn. This level of security is based on a secret that communicating entities share.

One may also consider the level of security provided in section C as an end-to-end security for node data packets NDPi communicated between server S1 and the end nodes selected according to the common characteristic.

The level of end node security may be provided authenticity only for individual node data packets NDPi, as authenticity and encryption for individual node data packets NDPi in a transmission case, or as verification and decryption in a reception case. In section C, all node data packets NDP1, . . . , NDPy representing the server payload SP are shown with security on a node data packet level.

It will be appreciated that one may choose to secure only selected node data packets NDPi on a node data packet level. Such selected security on a node data packet level may reduce the effort required at the end nodes authenticating only, authenticating and encrypting, or verifying and decrypting individual node data packets NDPi. It may be convenient to use a modulus operation to decide which individual node data packets to provide with security on node data packet level and which ones not.

Node data packets NDPi not provided with security on a node data packet level are not protected against being altered when communicated between the server S1 and the end nodes selected according to the common characteristic CoC.

It is of interest for the server S1 and the end nodes En1, . . . , En1 selected according to the common characteristic CoC to establish a secret (Sec). The server S1, and the end nodes En1, . . . , En1 may use the secret Sec to provide the security on end node data packets NDP1, . . . , NDPy for authentication only, or authentication and encryption when transmitting end node data packets. Likewise, the secret Sec could be used to establish security on a node data packet level when receiving end node data packets for authentication only, or verification and decryption.

It is a design choice whether one in-vehicle end point Enx is configured to establish a secret Sec with the server S1 or whether the end point Enx is only configured to request a secret Sec to be established. It might be of advantage to have the end point Enx configured to request establishment of a secret Sec, as such request is likely to require less resources at the end point Enx compared to the end point Enx having to identify a secret. It might further be convenient to implement this request as a control plane message within the IVN.

The request for establishment of a secret by the individual end node Eni may be sent as one or more node data packets NDPi. It would further be useful for the one or more node data packets NDPi to comprise an indication which server the one or more node data packets shall be forwarded to. One of the relays Re1, . . . , Rek receiving the one or more end node data packets may forward them as one or more server data packets SDPi comprising the node data packets. The indication of the intended server may conveniently project on to the individual server data packet SDPi.

A relay Re (see FIG. 2) relaying individual end node data packets NDPi into or out of the in-vehicle network IVN will be unable to authenticate, encrypt, verify, or decrypt any NDPi provided with the level of end node packet security, if the relay Re does not know the secret Sec established between the server S1 and the end nodes En1, . . . , En1 selected according to the common characteristic CoC. It will be appreciated that the server payload SP embodying a software update or an optimization in response to a server task may be an asset of the third-party service provider which shall only be shared with the selected end node but not with any of the nodes in between the server S1 and the end node.

The situation is similar for an additional server (not shown). An individual server data packet SDPi (according to section C of FIG. 3) may pass on its way to one of the relays Re1, . . . , Rek. While the additional server may be able to read the individual server data packet SDPi as they are not secured in section C, it is not able to authenticate, verify authenticity, or decrypt any node data packet it receives with security on a node data packet level. Nor is the additional server able to replace a node data packet NDPi without this replacement being noticed at the recipient of the replaced node data packet. In the interest of brevity, we may want to refer to verify authenticity and decrypt also as 'verify and decrypt' within this disclosure.

The additional server requires knowledge of the secret Sec to be successful in its replacing attempt, as without the secret Sec it is unable to authenticate, to authenticate and encrypt, as well as to verify and decrypt the individual end node data packets secured on a node data packet level.

If the server S1 and the end points En1, . . . , En1 use the secret Sec to establish node data packet level security, one could call this a group node packet level security.

If, however, the server S1 was to use a key K1Sec derived from the secret and end nodes Eni selected according to the common characteristic CoC used a different key KiSec derived from the secret Sec to provide the security for individual node data packets NDPi, one may refer to this approach as individual node level security.

It may be of interest to add a freshness value scheme to the security on (end) node data packet level. Freshness value schemes are useful to prevent replay attacks. A freshness value may be attached to each data packet to be secured against replay attacks. All communicating parties may agree on a starting value FVstart for the freshness value and a freshness increment FVinc from one data packet to the next one. Further, it makes sense for the freshness values to be considered in the authentication only, the authentication and encryption, as well as the verification and decryption modes.

One may further decide to not give a freshness value FV to all data packets within a sequence of data packets to be protected. This may be of advantage if one of the communicating parties is limited in terms of resources as may be the case for the end nodes compared to the server S1. End nodes En1, . . . , En1 will be dealing with a large number of freshness values in order to prevent or identify replay attacks on a node data packet level. However, not giving a freshness value FV to all individual data packets within a sequence of data packets to be protected end-to-end on a packet layer level, poses the risk of only discovering a replay attack with a certain delay.

One may enable an individual end node Eni to cause an error message should freshness values exceed the maximum freshness value FVmax or come a margin close to exceeding. Under the same token, the end node Eni may decide to reject received end node data packets NDPi. The individual end node Eni may further trigger establishment of a new secret Sec* to be used between the end node Eni and the server S1.

It may be of interest for an end node requesting establishment of a secret Sec with the server S1 to communicate boundaries of a freshness value scheme to be met, so that the end node can maintain replay protection in communication with the server S1. Alternatively, establishing a freshness value scheme may be handled by the server S1 in response to the request to establish a common secret from the end node.

Section D of FIG. 3 illustrates a variant of a sequence of server data packets SDP1, . . . , SDPm, across which the server payload SP is distributed, as groups of three node data packets NDPi within the individual server data packets SDPi. Different to the situation in sections B and C, individual node data packets NDPi no longer provide security on a node data packet level, and consequently there is also no replay protection for the sequence of node data packets NDP1, . . . , NDPy.

In section D of FIG. 3, individual server data packets SDP1, . . . , SDPm are provided with security on a server data packet level only for the sequence of server data packets SDP1, . . . , SDPm, while node data packets NDP1, . . . , NDPy are communicated to the end nodes En1, . . . , Eno (see FIG. 2) selected according to the common characteristic CoC.

It will be of interest to establish the security on a server data packet level between the server S1 and the at least one relay Ri, . . . , Rk in order to achieve end-to-end security for the portion of communication over the server network. To establish this, the server S1 and the at least one relay Re1, . . . , Rek may agree on a common secret Sec. The communicating parties may use the secret Sec for group security, namely authentication, encryption, and decryption.

Alternatively, each party communicating with end-to-end security on server data packet level may derive an individual key KiSec from the established secret Sec and use its individual key for authentication, encryption, and decryption of individual server data packets SDPi.

Finally, section E of FIG. 3 illustrates a communication between the server S1 and end nodes En1, . . . , Enk according to the common characteristic CoC. It will be appreciated that section E of FIG. 3 provides end-to-end security for end node data packets NDP1, . . . , NDPy representing the server payload SP, as was the case for section C of FIG. 3. Additionally, section E also incorporates end-to-end security on a server data packet level, as was the case for section D of FIG. 3.

Figure 4A:
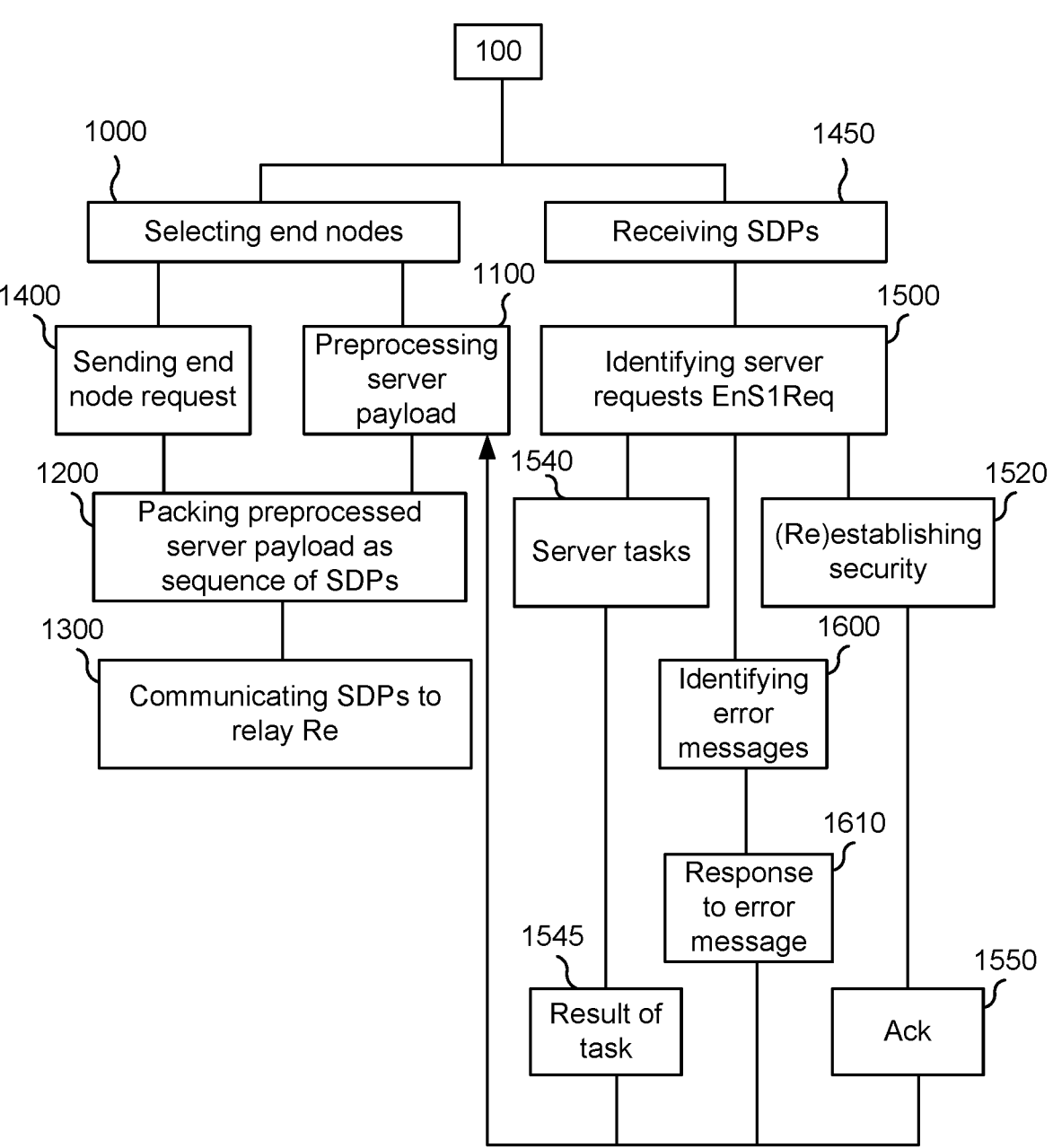
FIG. 4A illustrates a method of operating a server.

FIG. 4A illustrates a method 100 for communicating a server payload SP from a server S1 to one or more in-vehicle end nodes En1, . . . , Enx. The end nodes En1, . . . , Enx may all be located within one vehicle or distributed over a portion of a vehicle fleet V1, . . . , Vk (see FIG. 2).

The method comprises an operation 1000 of selecting end nodes En1, . . . , Enx. As discussed before, the end nodes En1, . . . , Enx may be selected according to a common characteristic CoC. In a way, the common characteristic CoC helps organizing the preprocessing of the server payload SP uniformly for all vehicles meeting the common characteristic CoC.

The method further comprises a preprocessing 1100 of a server payload SP. As discussed with regard to FIG. 3, the server payload SP is divided into a sequence of node data packets NDP1, . . . , NDPy (best seen in section A of FIG. 3) as part of the preprocessing 1100. While for illustrative purposes it may be useful to consider the server payload (SP) as a sequence of node data packets NDP1, . . . , NDPy, a case where the complete server payload SP can be accommodated in a single node data packet NDPi is intended to be considered part of this disclosure.

As mentioned before, the native server payload SP may already include some preprocessing, considering some hardware elements present within the end nodes En1, . . . , Enx, as was discussed before by compressing audio data using an audio CODEC for which an accelerator element is present at the end nodes En1, . . . , Enx in relation to the speech recognition example.

The method may further comprise an operation 1400 of sending end node requests S1EnReq from the server S1 to the end nodes En1, . . . , Enx. For an end node request S1EnReq to be sent to the selected end nodes En1, . . . , Enx, the end node request S1EnReq may replace the preprocessing 1100 of server payload SP. It seems fair to assume that an end node request S1EnReq by definition is in a format that the end nodes En1, . . . , Enx can understand and that can without alteration be communicated within the IVN as one or more node data packets. It will however be appreciated, that the server request S1EnReq may comprise in fact a sequence of node data packets NDP1, . . . , NDPm, depending on circumstances.

The method 100 may further comprise a packing 1200 of the preprocessed server payload SP, namely the sequence of end node data packets discussed with regards to operation 1100, into a sequence of server data packets SDPs. While it may be useful for illustration purposes to discuss a sequence of server data packets carrying the preprocessed server payload SP, a case of the server payload SP being represented by a single server data packet SDPi is intended to be considered part of this disclosure.

The method 100 further comprises an operation 1300 of communicating the sequence of server data packets SDPs to at least one relay Re1, . . . , Rek.

The method 100 may further comprise an operation 1450 of receiving server data packets SDPs from within the server network. Likewise, server data packets SDPs may be received from the relay Re. In addition, an entity setting up secrets Sec between communicating entities, may send one or more sensor data packets SDPi in order to establish the secrets.

The method 100 further comprises an operation 1500 of identifying server requests EnS1Req from end nodes En1, . . . , Enx. End node server requests EnS1Req are requests that individual ones of the end nodes En1, . . . , Enx may send to the server S1 in order to shift a task from the end nodes to the server, in order to extent functionality available at the end node.

The operation 1450 may further comprise receiving server requests from the relays Re1, . . . , Rek (best seen in FIG. 2). In the context of receiving SDPs in operation 1450, receiving error messages at the server S1 may also be considered server requests as they may trigger an action from the server S1 once received at the server S1.

The method 100 may further comprise an operation 1600 of identifying error messages. The error messages may be received from the end nodes En1, . . . , Enx for errors on end node level and be forwarded by the relays Re1, . . . , Rek. Further the error messages may be received from the relays Re1, . . . Rek for errors on a server network level. In addition, error messages may be identified in operation 1600 from entities external to the server S1, the relays Re1, . . . , Rek, or the end nodes En1, . . . , Enx. One case where such a scenario may occur, would be a security server establishing secrets as described herein.

If operation 1500 identified a server task, the server task may be performed in an operation 1540 and in an operation 1545 a result of the server task may become available.

If operation 1500 identified an error message, the error messages may be processed in an operation 1600. If the identified error messages relate to a corresponding response, such response may be performed in an operation 1610.

If operation 1500 identified a request to (re-) establish security, such request may be performed in an operation 1520. The method 100 may further comprise an acknowledgement Ack indicating in an operation 1550 that the re-establishing of security was successful.

The operation 1520 of establishing security or reestablishing security may be executed in response to receiving a reoccurring error decrypting secured data packets on node data packet level or on server data packet level. Reestablishing security may further be convenient, should a freshness value error be identified for subsequent data packets on either server data packet level or node data packet level. The corresponding freshness value scheme may be reestablished in response to receiving the corresponding messages from either one of the end nodes En1, . . . , Enx or one of the relays Re1, . . . , Ren. As part of operation 1520 the server S1 may communicate a new secret to the end nodes En1, . . . , Enx in order to establish security on node data packet level. Likewise, the server S1 may communicate a new secret Sec* to the relays Re1, . . . , Ren in order to establish security on server data packet level. The same goes for communicating new freshness schemes on either node data packet level, server data packet level, or both.

The operation of establishing security 1520 may further be executed in response to an end node terminating the end-to-end secured communication with the server S1 for whatever reason. Conceivable reasons may include authentication, encryption, or freshness value errors on node data packet level.

The operation 1520 may comprise an optional operation 1550 of acknowledging, once the security is established or reestablished.

Operation 1500 may further comprise an operation 1540 of performing a server task S1Task. The server task may comprise optimizing operational parameters for a subsystem. The subsystem could be audio parameters of an in-cabin infotainment system to reduce unwanted resonances or echoing. In such case, the server would return the result of the server task S1Task as a new payload to those end nodes pertaining to the infotainment subsystem. The server task may include using recorded audio files from in-cabin microphones related to a test signal that was played via loudspeakers.

In a similar fashion, the server task S1Task may comprise optimizing operational parameters of a battery management system (BMS). The server S1 may request current or past operational parameters of the end nodes pertaining to the BMS as part of the server task S1Task. Alternatively, the current or past parameters of the BMS may be forwarded from the end nodes to the server S1 in connection with the end node request submitted to the server S1. Operational parameters of the BMS may include state-of-charge (SoC) or state-of-health (SoH) to give just two examples.

The server task may however also comprise server tasks that do not comprise communication of a result to the end nodes. Such a scenario is conceivable for an insurer or a leasing company storing critical vehicle states in order to adapt the leasing rate or the insurance premium accordingly. For such tasks, there might not be an operation 1545 of communicating the results of the server task S1Task, and it might be more appropriate to send an acknowledge command to the end nodes, so they know their data was securely received.

In cases where there is however a result of the server task being communicated to the end nodes, the server S1 may, once the results are available in operation 1545, communicate these results to the end nodes as selected according to the common characteristic CoC. Therefore, there is a connection shown to the preprocessing operation 1100, as discussed before.

The results of the server task available in operation 1545, the response to the error messages performed in operation 1610, or the acknowledgement indicated in operation 1550 may be treated like a server payload SP that should be eventually communicated in the operation 1300 as SDPs to the relay Re.

Therefore, any data available in operations 1545, 1610, or 1550 may be forwarded to the preprocessing operation 1100 as discussed above.

It will be appreciated that the operation 1610 is not intended to illustrate all potential error handling at the server S1 but rather how this information can be communicated so that all communicating entities work together in case of error messages.

Figure 4B:
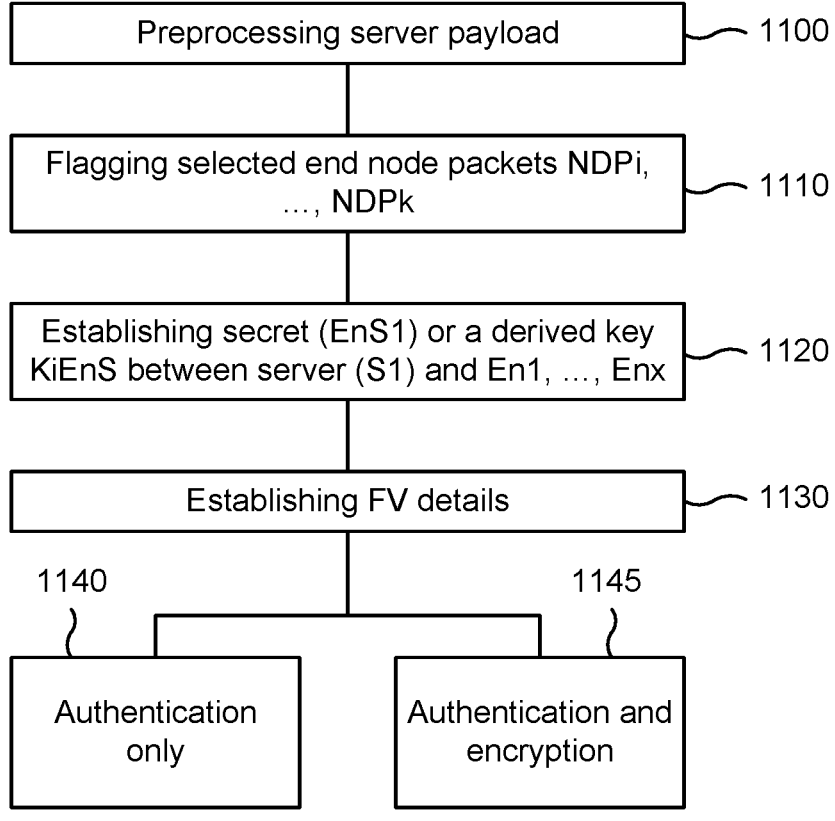
FIG. 4B illustrates details of a method of preprocessing of a server payload.

FIG. 4B illustrates further details on the operation 1100 of preprocessing the server payload SP. There may be an operation 1110 of flagging selected end node packets NDPi, . . . , NDPk within the sequence of node data packets NDP1, . . . , NDPy representing the server payload. It may be of interest to flag such node data packets that are to be treated with a special priority.

Such prioritization may be implemented according to various measures available in Time Sensitive Networking (TSN) and Quality of Service (QOS). For example, if these data packets indicate critical road conditions, those packets may be communicated via faster channels to vehicles in the vicinity. Smart base stations on server network level may provide such functionality. As this functionality may however not be available on the node data packet level, one would wish for the flagging to project onto server package level, as will be explained further down with regards to FIG. 4C.

It may further be convenient to tag node data packets NDPi representing any of the information available as result of the server task in operation 1545, the response to an error message available in operation 1610, information pertaining to the re-establishing of security in the operation 1520, or the information pertaining to the acknowledgement of the operation 1550.

Flagged node data packet may be in the form of control messages of the IVN or any other suitable format to make sure they are being recognized, even if the server S1, the relay Re, or the end node had paused their communicating into their respective networks.

The operation 1100 may further comprise an operation 1120 of establishing a secret EnS1 between end nodes En1, . . . , Enx selected according to the common characteristic CoC and the server S1. The secret EnS1 may be used for group encryption between the server S1 and the end nodes En1, . . . , Enx. If, however, individual encryption was desired, one would derive individual keys KiEnS for each one of the server S1 and individual ones of the selected end nodes En1, . . . , Enx. If it is intended to reach individual encryption between all communicating parties, each of the end nodes En1, . . . , Enx and the server S1 would use an individual derived key KiEnS for authentication, encryption, and decryption.

As a further option for the operation 1100 there might be an operation 1130 of establishing freshness value details for all communicating parties. These details may include a freshness value scheme, including the start freshness value FVstart, a freshness value range FVrange, a freshness value increment FVinc, a maximum freshness value FVmax. The freshness value increment FVinc may be an increase between subsequent packets awarded a freshness value or an increase between subsequent data packets.

After the freshness value scheme is agreed in operation 1130, security on a node data packet level may be set up in a following operation. It is of interest to set up the freshness regime prior to the security setup in order for authentication only measures or authentication and encryption measures to cover the individual freshness value attached to a node data packet. This is convenient to prevent the freshness values to be altered without the receiving end nodes noticing. If security is only provided on a node data packet level but not on a server package level, one reaches the situation depicted in section C of FIG. 3.

An operation 1140 establishes security as authentication only on a node data packet level. To this end, an authentication tag is calculated for an individual end node packet NDPi including the freshness value according to the freshness value regime. It may be of interest on server side to use cipher modes that are available within the end nodes En1, . . . , Enx as hardware accelerators in order to reduce a burden for authentication at the end nodes. Examples of end node ciphers might include AES-GCM of a given length or ASCON as a promising candidate for use also in a post-quantum era.

An operation 1145 may establish authentication and encryption on an end node package level. Individual node data packets NDPi may therefore be authenticated and encrypted. Again, one would like to use cipher modes for authentication and encryption that are available as accelerators within the individual end nodes En1, . . . , Enx as this would reduce the burden for the establishment of authenticated and encrypted security and the selected end nodes En1, . . . , Enx.

Figure 4C:
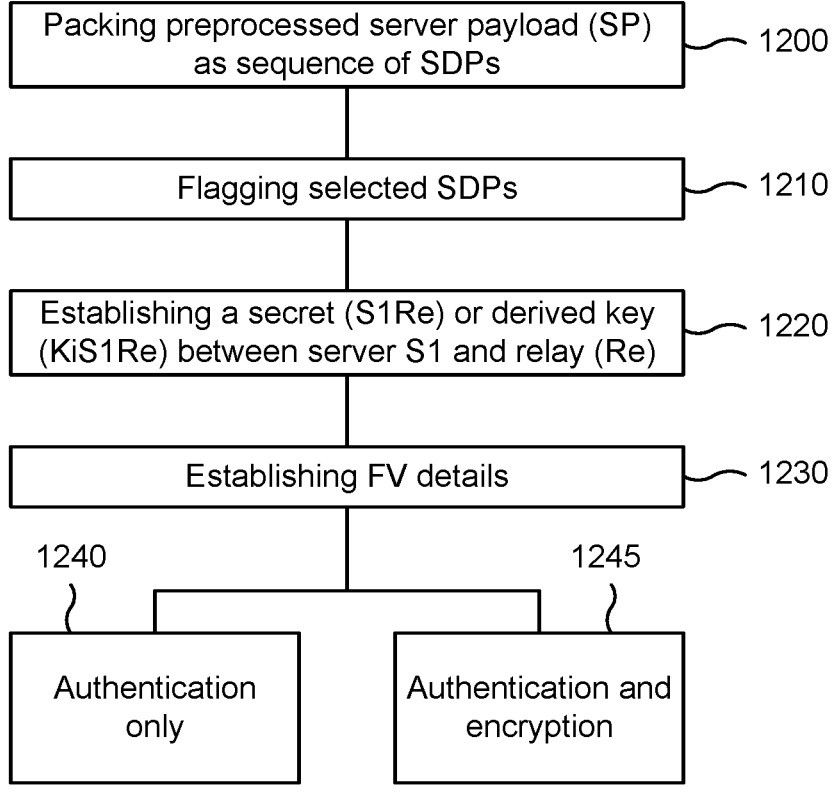
FIG. 4C illustrates details of an operation of packing of a preprocessed server payload.

FIG. 4C illustrates details about the operation 1200 of packing the preprocessed server payload SP in the form of a sequence of node data packets NDP1, . . . , NDPy into a sequence of server data packets SDP1, . . . , SDPm as is illustrated in FIG. 3.

The operation 1200 may further comprise an operation 1210 of flagging selected SDPs out of the sequence of server data packets SDP1, . . . , SDPy. It may be of interest to flag those server data packets containing one or more flagged node data packets. This may be useful to project priority given to node data packets to the server data packet level, in order for the server network to treat the flagged server data packets accordingly. The projection of flagging on node data packet level onto server data packet level may take advantage from a "quasi peer to peer communication" available for the server network but potentially not on end node level.

The operation 1200 may further comprise an operation 1220 of establishing a secret S1Re between the relays Re1, . . . , Rek and the server S1. The secret S1Re may be used for symmetric encryption between the server S1 and the relays Re1, . . . , Rek. If however individual encryption was desired, one would derive individual keys KiS1Re for each for the server S1 and individual ones of the relays Re1, . . . , Rek. If it is intended to reach fully individual encryption, each of the relays Re1, . . . , Rek and the server S1 would use an individual derived key KiSRe for authentication only, authenticated encryption, or authenticated decryption.

As a further option for the operation 1200 there might be an operation 1230 of establishing freshness value scheme for all communicating parties. These details may include a freshness value scheme, including the start freshness value FVstart, a freshness value range FVrange, a freshness value increment FVinc, or a maximum freshness value FVmax. The freshness value increment FVinc may be an increase between subsequent data packets awarded a freshness value or an increase between subsequent data packets. In the operation 1230, the freshness value scheme may be set up on the server package level.

After the freshness value is agreed on in operation 1230, security on server data packet level may be set up in a following operation. It is of interest to set up the freshness regime together with the security setup in order for authentication only measures or authentication and encryption measures cover the individual freshness value attached to a data packet, as was already explained on a node data packet level for operation 1130.

If security is only provided on a server data packet level but not on a node data packet level, one will reach the situation depicted in section D in FIG. 3. If security is however established on both end node data packet level and server data packet level, one will reach the situation depicted in section E of FIG. 3. If no security is provided on neither node data packet level nor on server data level, one is faced with the situation depicted in section B of FIG. 3.

An operation 1240 establishes security as authentication only on a server data packet level. To this end, an authentication tag is calculated for an individual server data packet SDPi including the freshness value according to the freshness value regime. It may be of interest on server side to use cipher modes that are available within the end nodes En1, . . . , Enx as hardware accelerators, as was already explained in connection with operation 1140 above.

An operation 1245 may establish authentication and encryption on a server data package level. Individual server data packets SDPi may therefore be authenticated and encrypted. Again, one would like to use cipher modes for authentication and encryption that are available as accelerators within the individual nodes of the server network, particularly within the relays Re1, . . . , Rek as they are expected to be the last server node travelled to before the node data packets are relayed to the IVN to which the end nodes are coupled or at least couplable.

Figure 5A:
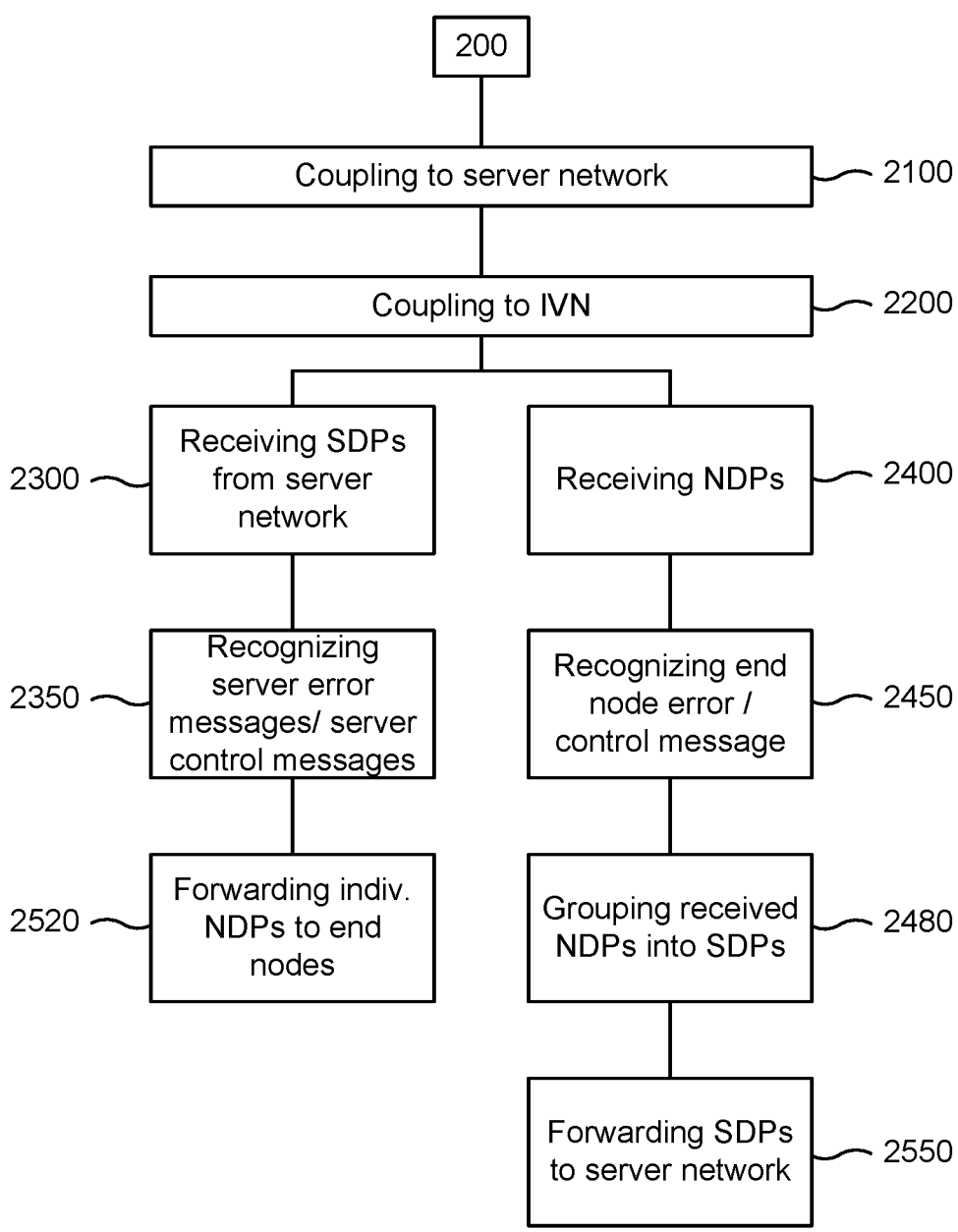
FIG. 5A illustrates a method of relaying.

FIG. 5A illustrates a method 200 of relaying. The method may be implemented by the relay as disclosed in here. The method 200 may comprise an operation 2100 of coupling to a server network. Through the coupling 2100, individual servers are now couplable to the relay.

The method 200 may further comprise an operation 2200 of coupling to an in-vehicle network IVN, and hence end nodes within the in-vehicle network may become couplable to the relay.

The method 200 may further comprise an operation 2300 of receiving SDPs from a server network. The server network may be the one the relay is coupled to. The method 200 may further comprise an operation 2350 of recognizing server error messages or server control messages via the coupling to the server network.

The method 200 may further comprise an operation 2520 of forwarding individual node data packets NDPi, . . . , NDPk to the end nodes En1, . . . , Enx. The node data packets NDPi, . . . , NDPk are (directly) usable within the IVN and hence no further processing is required. Therefore, the relay may just unpack individual node data packets NDPi, . . . , NDPk from the received server data packet SDPi or the sequence of server data packets SDP1, . . . , SDPm.

The method 200 may further comprise an operation 2400 of receiving node data packets NDPs from within the IVN. The node data packets received at the relay Re may comprise a forward indication as to which server shall receive the node data packets.

Method 200 may further comprise an operation 2450 of recognizing an end node error or an end node control message.

Method 200 may further comprise an operation 2480 of grouping received node data packets NDPs into one or more server data packets SDPs. The SDPs are usable within the server network.

The method 200 may further comprise an operation 2550 of forwarding the one or more server data packets SDPs to the server network.

Figure 5B:
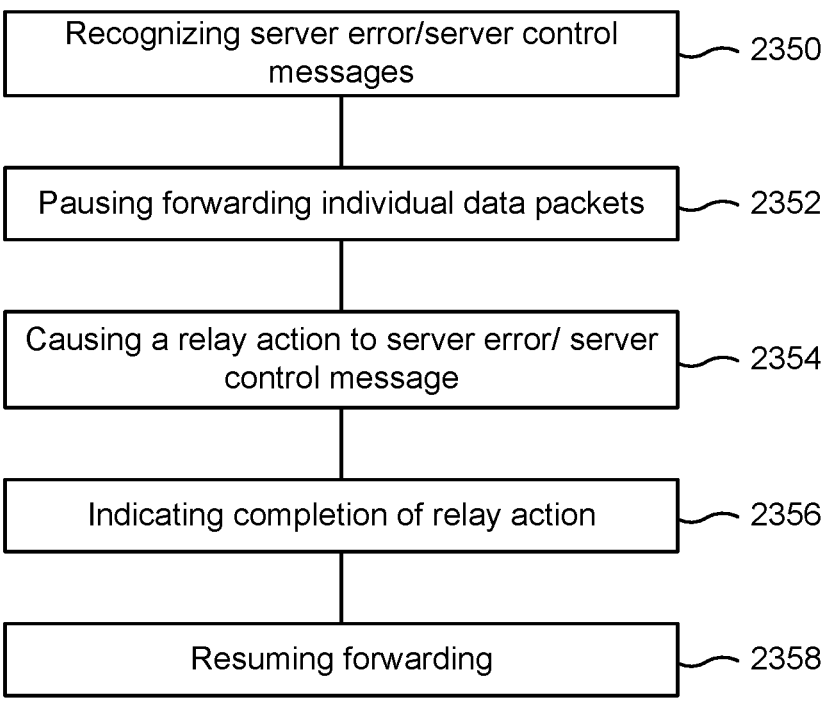
FIG. 5B illustrates an operation of recognizing.

FIG. 5B illustrates further details on the operation 2350 of recognizing server error or server control messages. This is to say the relay is capable of identifying server error messages or control messages as communicated within the server network. These server error messages may indicate a re-establishment of the secret used to establish security on a server level. Another example is to trigger the relay Re to derive a new key K*Sec from the secret. Such server error messages may be caused by repeated errors in decrypting and/or authenticating server data packets received from the relay.

The operation 2350 may comprise an operation 2352 of pausing forwarding of individual data packets in response to recognizing server error messages or server control messages. This may comprise pausing a forwarding of individual node data packets to the IVN. This may be helpful to keep communication of the end node data packets NDPi, . . . , NDPk meaningful and not to burden the end nodes En1, . . . , Enx with authentication or authentication and decryption of invalid node data packets. Likewise, the operation 2352 may further comprise pausing a forwarding of server data packets, be it from the relay to the server S1 and/or forwarding of server data packets from the sever S1 to the relay.

The operation 2350 may further comprise an operation 2354. The operation 2354 may cause a relay action in response to server error or server control message. It may entail a reconfiguration of the relay for the server network part of it. It may further cause a message to the IVN that the relay Re is currently not available for end nodes within the IVN.

The operation 2350 may further entail an operation 2356 in which the relay indicates completion of relay action related to operation 2354. This may include a message to the server transmitting the server error or server control message, or an indication that the relay is again available within the IVN.

The operation 2350 may further entail an operation 2358 of resuming forwarding of individual data packets. The forwarding may be resumed for the end node data packets that the relay forwards to the in-vehicle network. The resuming may further include resuming forwarding of server data packets to the server network. The resuming may therefore include a resuming of grouping operation 2480.

Figure 5C:
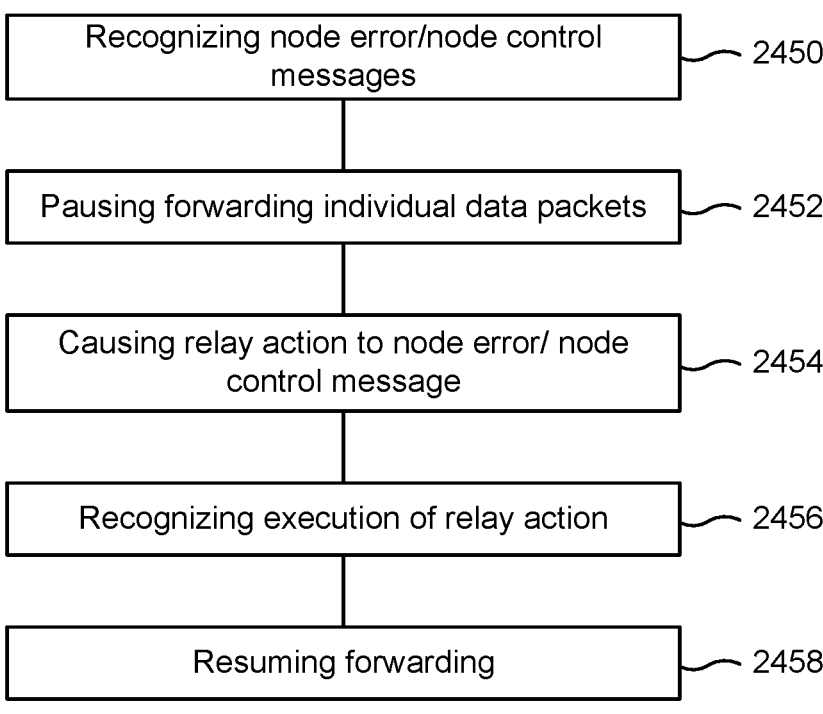
FIG. 5C illustrates an operation of recognizing.

FIG. 5C illustrates further details on the operation 2450 of recognizing node errors or node control messages. This is to say the relay Re is capable of identifying node error messages or control messages as communicated within the in-vehicle network. These node error messages may indicate a request for re-establishment of the secret used to establish security between the end node and the server. The node error message may further indicate a faulty node packet received by one or more nodes within the IVN. The node error message may further indicate a reboot of a particular end node. The reboot may cause the rebooting end node not to be available for a reboot period.

The operation 2450 may comprise an operation 2452 of pausing forwarding of individual data packets in response to recognizing end node error messages or end node control messages. This may comprise pausing a forwarding of individual node data packets to the IVN. Such pausing may be helpful to keep communication of the end node data packets NDPi, . . . , NDPk meaningful and not to burden the end nodes En1, . . . , Enx with authentication or authentication and decryption of invalid node data packets NDPi, . . . , NDPk. Likewise, the operation 2452 may further comprise pausing a forwarding of server data packets SDPi, SDPk between the relay and the server network.

The operation 2450 may further comprise an operation 2454. The operation 2454 may cause a relay action in response to the node error message or the node control message recognized in operation 2450. Such relay action may entail a reconfiguration of the relay for the IVN part of it. It may further cause a message to the IVN that the relay Re is currently not available for end nodes within the IVN, for example due to a reboot of the relay. The operation 2450 may further case a re-configuration of the server network part of the relay together with an unavailability of the relay within the server network and corresponding messages pertaining thereto.

One example of a node error message is a request to the server to resend a faulty node packet (SreS). The relay RE may group the server resend request SreS into a server data packet and forward it to the server network as a relay action in operation 2454.

The operation 2450 may further entail an operation 2456 in which the relay recognizes execution of the relay action of operation 2454. This could be one or more server data packets SDP1, . . . , SDPm comprising an indication that these server data packets comprise a resend version of faulty node data packets NDPf and therefore is an execution message in this regard. Another example would be a message sent by the relay to either the IVN and/or the server network to indicate that the relay is again available for respective communication.

The operation 2350 may further entail an operation 2358 of resuming forwarding of individual data packets. The forwarding may be resumed for the end node data packets that the relay forwards to the in-vehicle network. The resuming may further include resuming forwarding of server data packets to the server network. The resuming may therefore include a resuming of grouping operation 2480 as described before.

Figure 6A:
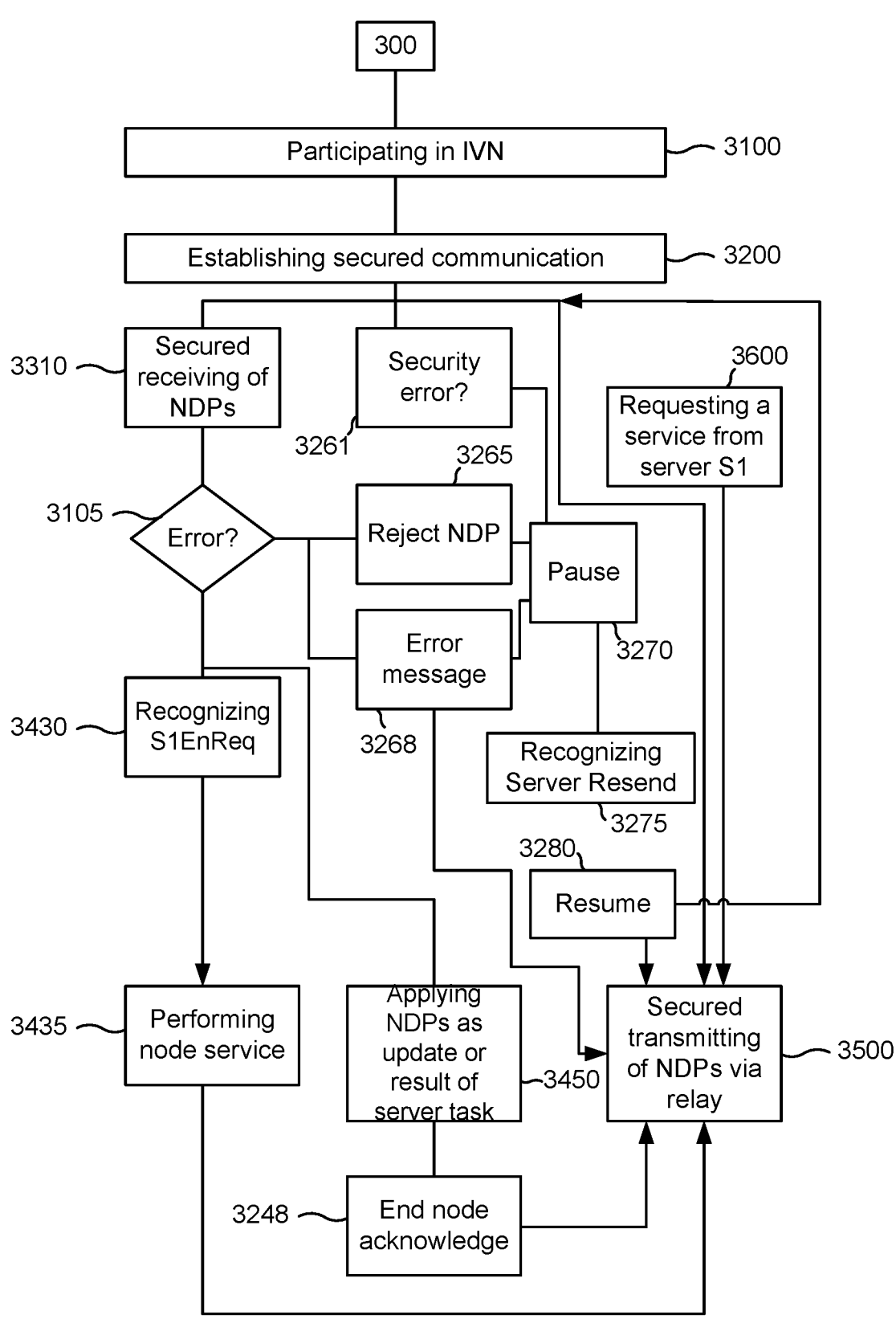
FIG. 6A illustrates a method of operating an end node.

FIG. 6A illustrates a method 300 of operating an end node En1 securely communicating with a server S1. The method 300 may comprise an operation 3100 of the end node En1 participating in an in-vehicle network IVN. The method may further comprise an operation 3200 of establishing a secured communication between the end node En1 and the server S1.

The method 300 may further comprise an operation 3310 of secured receiving of (end) node data packets NDPs. The method may further comprise an operation 3261 of identifying if a security error occurred. The security error is to cover any errors that may interrupt security of the secured communication established in operation 3200. Such error may be caused by a freshness value mismatch, between end node En1 and the server S1, or a freshness value overflow at either party. Further a secret Sec or a key derived from the secret Ksec may have become invalid.

The method 300 may further comprise an operation 3500 of secured transmitting of node data packets NDPs to the server S1 via at least one relay Re.

The node data packets NDPs securely received in operation 3310 may be inspected in operation 3105 with regards to any errors. As before, the error may be an error related to the freshness value scheme, an invalidity of the secret Sec or the key K1Sec derived from the secret, a problem in authenticating the securely received NDP, or an error in decrypting and verifying the securely received NDP. If any of the security related errors are detected at operation 3105, the NDP that is recognized as a faulty node data packet NDPf, may be rejected in an operation 3265.

Alternatively, or additionally, the faulty data packet NDPf may trigger an error (Emes) that may be transmitted to the server S1, as shown at operation 3268. Further additionally or alternatively, secure transmission of node data packets NDPi may be paused according to an operation 3270. Further, secured receiving 3310 may also be paused in case of a faulty data packet NDPf.

Secured transmitting according to operation 3500 may be resumed in an operation 3280, if the end node En and the server S1 succeed in re-establishing secured communication of operation 3200.

One may even consider to reboot the end node En1, re-establish the participation in the IVN according to operation 3100, or reestablish the secured communication according to operation 3200. Further, it is possible to stop the secured receiving of node data packets NDP at operation 3310 to not burden memory capabilities of the end node further.

The end node En1 may further be configured to recognize a server resend delivery (SreSEX) at operation 3275. There may be measures in place for the SreSEX to be recognized at the end node En1, even if the end node En1 is currently pausing 3270 some or all communication.

If in operation 3105 no error is detected, the end node En1 may either recognize in operation 3430 an end node service request (S1EnReq) in the securely received NDPs or may apply in an operation 3450 the securely received NDPs to the end node En1, be it as a software update or as a result form a server task (S1Task). In both cases it may require a sequence of node data packets NDP1, . . . , NDPy to fully represent the information that is being securely communicated to the end node En1.

The method 300 may further comprise an operation 3435 of performing an end node service. The performing of operation 3435 may be initiated by recognition of the server request S1EnReq or independent from operation 3430.

It will be appreciated that end node services may be a measuring task being performed as an end node service (EnServ). It will be appreciated that the end node may apply a certain measurement task only once, on a regular basis, storing results at the end node, and upon request or independently, and may forward the measurement results as a sequence of NDPs securely to the server S1.

One example of an end node service task could be measuring battery parameters of a battery management system. This measurement task may be performed regularly, results may be stored within the end node or transmitted securely to the server S1, depending on circumstances.

The measuring of in-cabin entertainment parameters using in-cabin microphones while a test signal is being played within the cabin, could be a further measurement task of the end node.

As a further example the in-cabin microphones may record the driver speaking a test phrase. Several other measurement services EnServ are conceivable as they reflect possible measurement tasks performed by in-vehicle end nodes.

Another example could be the end point collecting critical events related to a critical operational state of a vehicle, such as emergency braking, a critical current within the battery management system. As before, the critical events may be stored on the end node or after collection securely communicated to the server S1.

As a second group of end node tasks in operation 3435, the end node En1 may perform an actuating task. Such tasks are known to someone skilled in the art and we will only give some examples. The end node En1 may adjust chassis parameters of a vehicle in order to adapt to the driver's preferences as a sportive driver or a specific surrounding say dune surfing in the desert.

Actuating a braking system, a steering system, or adjusting an in-cabin lighting would be yet other examples of an actuating task of the end node En1. Actuating tasks performed by end nodes En are known in the art and shall therefore not be explained any further.

The method 300 may further comprise an operation 3600 of requesting a service from the server S1 via the relay Re1. One will appreciate that operation 3600 gives an opportunity to enhance or further functionality of the end node En1. As an example, the end node En1 may request from the server S1 to optimize operational parameters of a subsystem. A first example is the optimization of in-cabin audio parameters of an entertainment system. A second example is training a speech recognition module for a driver with the driver reading a test phrase while his voice is being recorded by in-cabin microphones. The recorded data may be communicated to the server S1. The server S1 having a larger compute power may derive some optimized parameters for the speech recognition system. One may therefore have the server optimize the performance of the speed recognition system at the server and transmit those parameters as its response back to the requesting end node.

Further, a service request from the end node En may be related to measured operational parameters of a battery management, asking the server to find an optimized parameter set for the battery management, in order to improve performance of the battery management system be it in terms of performance, energy efficiency of charging and discharging of batteries, or an extended lifetime of the BMS.

It will be appreciated that while the service requested may rely on data provided by the end node En. The service request to the server S1 may cause at the end point En1 to perform one or more actuating actions, or one or more further measurement actions in response to the service request EnS1Req initiated by the end node En1.

Figure 6B:
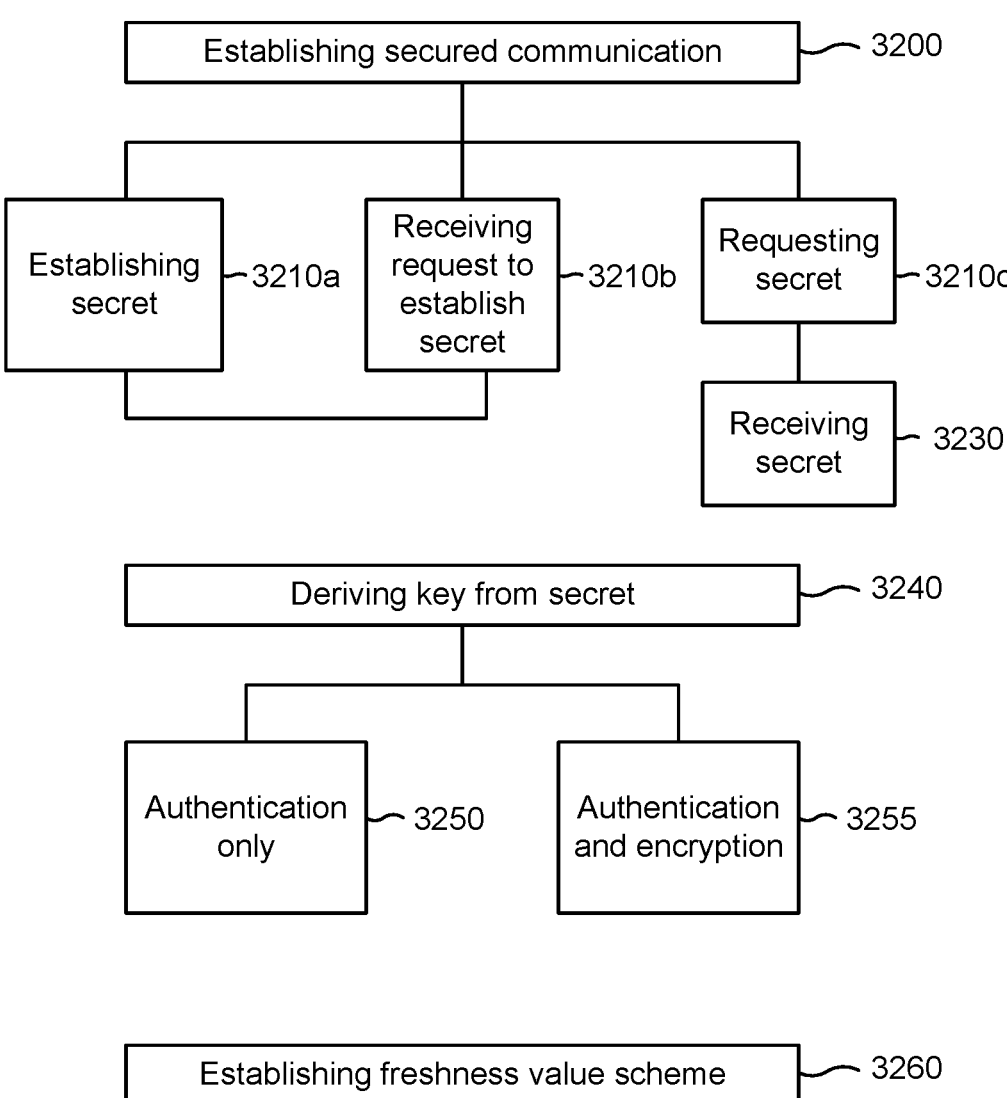
FIG. 6B illustrates an operation of establishing secured communication.

FIG. 6B illustrates details of establishing secured communication in operation 3200. In operation 3200, a secret between the end node En1 and the server may be established and several ways of achieving this are conceivable.

According to a first variant in operation 3210a the end node may establish the secret Sec itself. This may require more resources at the individual end node, and may however be quicker than requesting the server S1 to establish the secret or have third party, such as a key server, establish the secret Sec.

According to a second variant 3210b the end node En may receive a request to establish a secret. Again, it may be decided for the end node En to establish the secret itself, according to operation 3210a. A further alternative is illustrated in operation 3210c. Here the secret may be requested from the server S1, which would clearly have stronger computational power than En1 to compute a secret. As a further variant, one may choose to have a third party as some sort of key server providing a secret to the server and the end node.

In a variant of operation 3210c, the end node En may receive the secret in an operation 3230 form either the server S1 or the key server.

Operation 3200 may further comprise an operation 3240 of deriving a key K1Sec from the secret. Such key derived from secret Sec is of interest, if an individual encryption is intended.

In operation 3250, secured communication may be established as an authentication only scheme, while alternatively in operation 3255, an authentication and encryption scheme may be selected.

The operation 3200 may further comprise an operation 3260 of establishing a freshness value scheme as was discussed above inter alia with reference to FIGS. 2 and 3. It will be appreciated that the limited resources of the end node En in combination with the high number of node data packets needed to communicate a server payload SP, will make the end node En the deciding factor when it comes to the freshness value regime.

Figure 7A:
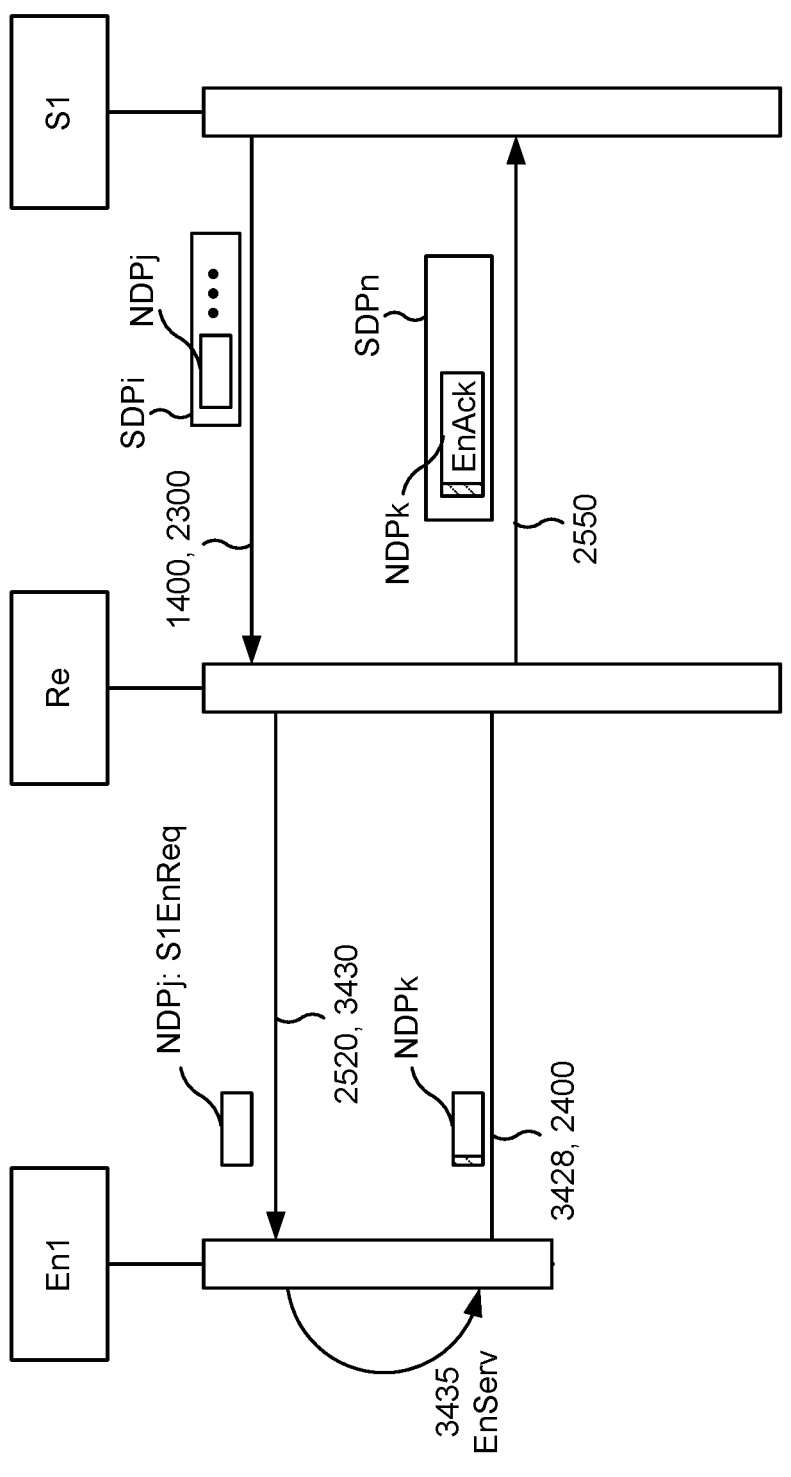
FIG. 7A illustrates transactions for a server S1 sending an end node service request S1EnReq via a relay Re.

FIG. 7A illustrates interactions between a server S1, a relay Re, and a selected end node En1, when the server S1 communicates an end node service request S1EnReq. The server S1 may transmit this request with an operation 1400. The end node service request S1EnReq may be in the form of one or more node data packets NDPj, due to the preprocessing discussed in section A of FIG. 3. The service request S1EnReq may be placed in one or more server data packets SDPi and the individual server data packets SDPi forwarded to the relay Re. The relay may receive the service request S1EnReq in an operation 2300 of receiving SDPs from the server network.

The relay may forward the received SDPs as the individual node data packets NDPj contained therein to the end node En1 in an operation 2520. The end node En1 may receive the end node packets NDPj and recognize them in an operation 3430 as the server request S1EnReq. Subsequently, the end node may perform a corresponding end node service EnServ in the operation 3435.

The end node En1 may acknowledge the server request S1EnReq or performance of the end node service EnServ in an operation 3428. Note that it might be convenient to communicate the acknowledgement EnAck as one or more secured end node packets NDPk. The end node data packets NDPk may be received by the relay in operation 2400 and after a grouping operation, as illustrated by the node data packet NDPk being grouped into a server data packet SDPn. The server data packet SDPn may be forwarded to the server network in an operation 2550 and received at the server S1.

While response to the performance of the end node service EnServ is depicted in FIG. 7A as a mere EnAck, the end node service may without limitation comprise transmitting measurement results, parameters polled at the end node, related operations, or any combination thereof.

Figure 7B:
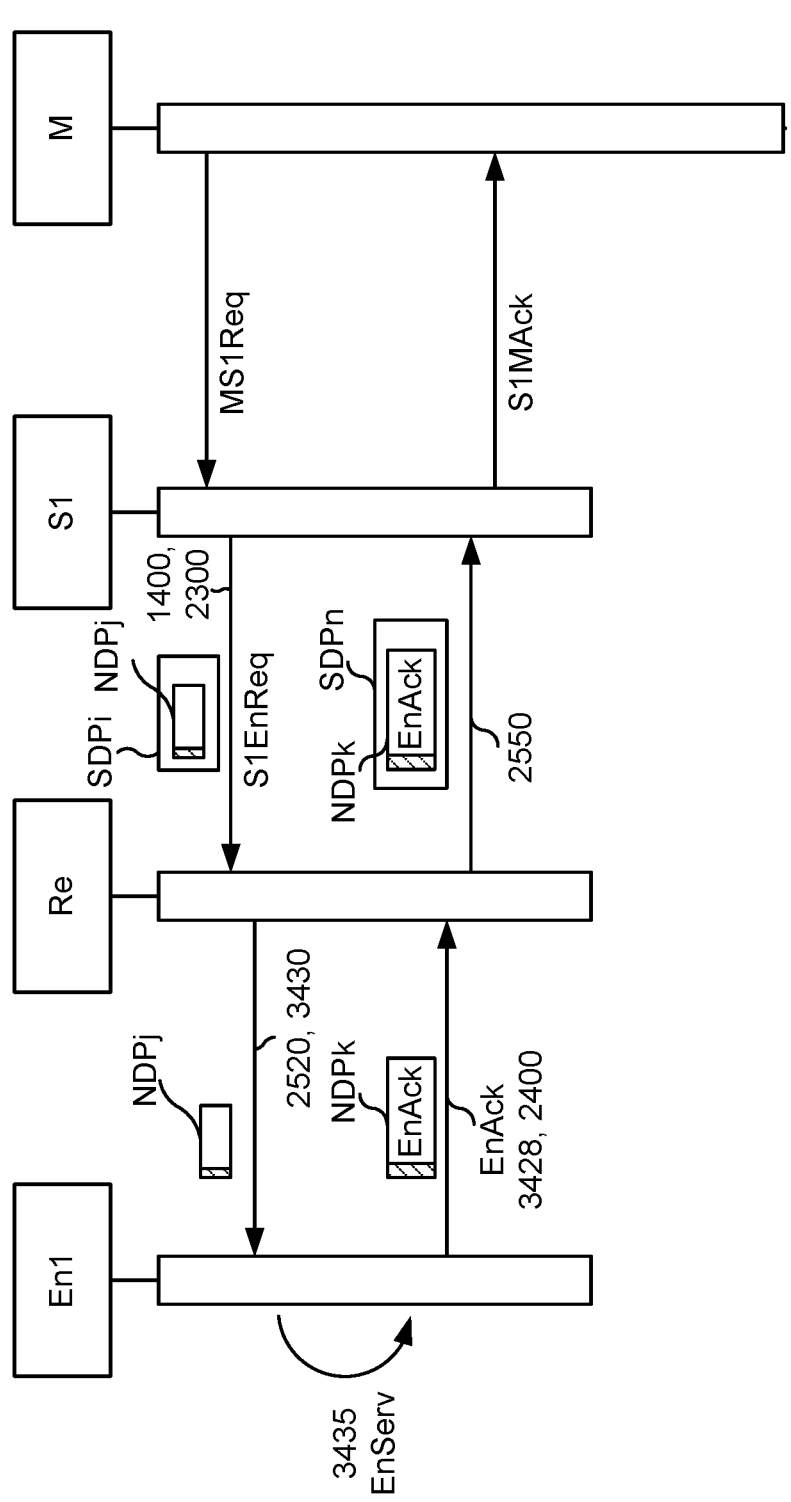
FIG. 7B illustrates an end node service request initiated by a user device M.

FIG. 7B illustrates how a mobile device M may initiate the end node service request S1EnReq. The cascade of transactions between end node En1, relay Re, and server S1 is identical to what was discussed in relation to FIG. 7A. New transactions are the mobile device M sending a message MS1Req from the mobile device M to the server S1. The connection between the mobile device M and the server S1 may be secured depending on circumstances. It will be appreciated that the mobile device M may be convenient for a driver of a car to request services from the server S1 or the end nodes within his vehicle. In principle, the mobile device M may control all functionality of the server S1 when securely communicating to end nodes En1, . . . , Enx selected according to the common characteristic as discussed above.

It seems a mere question of access rights how far capabilities of the mobile device M reach in controlling operation of the server S1 communicating with the end nodes En1, . . . , Enx.

Figure 7C:
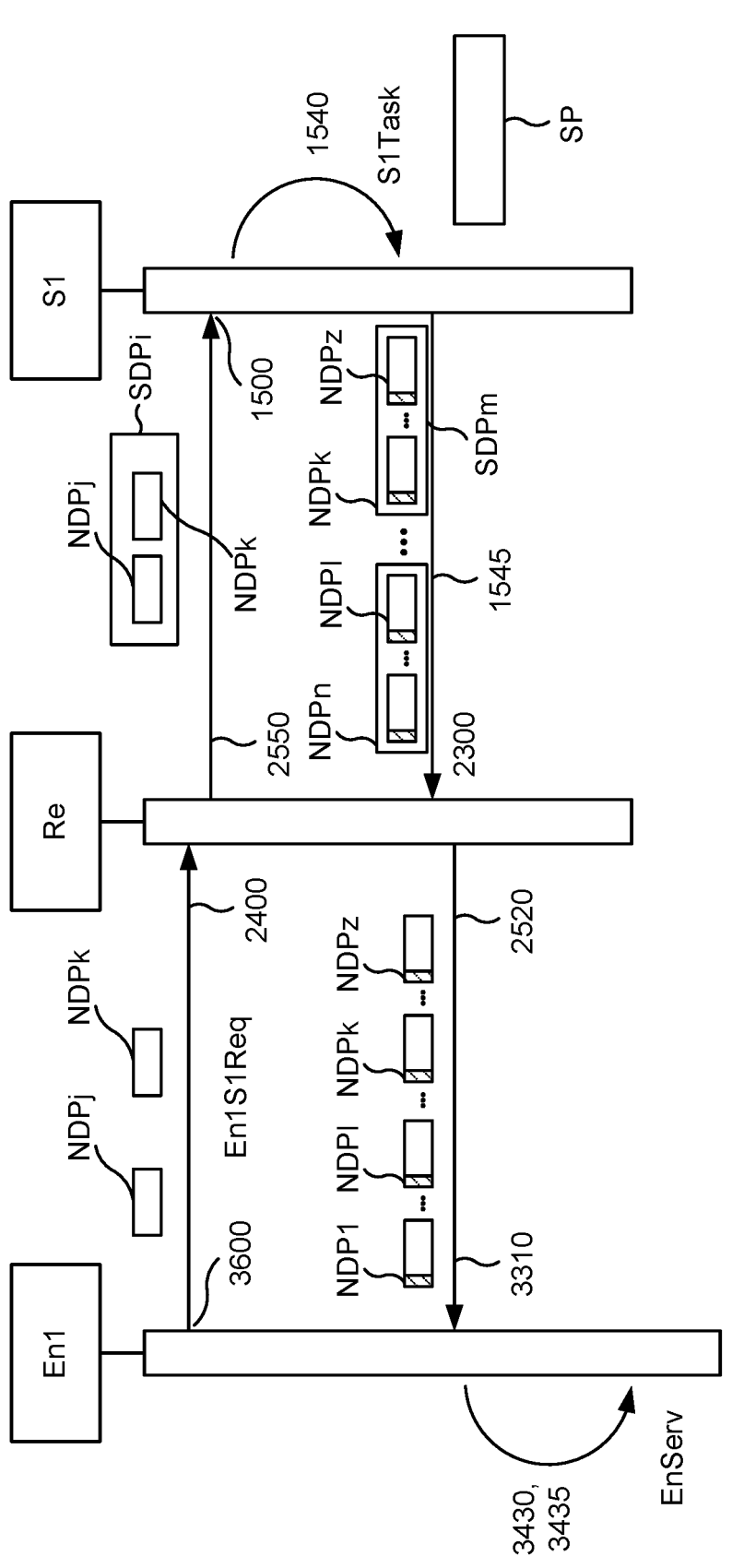
FIG. 7C illustrates an end node En1 requesting a service from server S1 via the relay Re.

FIG. 7C illustrates transactions between a given end node En1, a relay Re, and the server S1 when the end node En1 requests the server S1 to perform a server task S1Task. In the operation 3600, the end node En1 may request the service request En1S1 to server S1 via the relay Re. This request may be represented as one or more node data packets NDPj, . . . , NDPk, as illustrated in FIG. 7C. The relay may receive the sequence of end node data packets NDPj, . . . , NDPk in the operation 2400 and may forward them as one or more server data packets SDPi. As can be seen, the node data packets NDPj, . . . , NDPk are grouped in an operation 2480 into the server data packet SDPi in the operation 2550 of the relay Re. The one or more server data packets are received at the server S1 with the operation 1500.

In response to receiving the server request, the server S1 may perform the server task in the operation 1540. In the example of FIG. 7C, a result of the server task is present. This result may be transmitted to the end node En1 via the relay Re as a server payload SP.

The result of the server task S1Task may be communicated in the operation 1545. There might be an optional acknowledgement of the server task S1Task being performed in the operation 1555 of the server S1, the operation 1555 not being shown in FIG. 7C.

Note that the result communicated in the operation 1545 comprises node data packets NDP1, . . . , NDPz distributed over a sequence of server data packets SDP1, . . . , SDPm. The hatched portion of the node data packets NDP1, . . . , NDPz indicates a level of security for individual node data packets as discussed for section C of FIG. 3 providing end-to-end security between the end node En1, and the server S1.

It is further noted that the communication from the end node En1 via the relay Re to the server S1 was not secured. This may be chosen according to circumstances. If the server request En1S1Req requires a larger number of node data packets NDPj, . . . , NDPk to be transmitted, it may be convenient not to secure them. Such a scenario may be practical, if the server request En1S1Req was to include data collected at the end node En1.

The end node packages NDP1, . . . , NDPz are forwarded by the relay Re in an operation 2520 and received by the end node En1 in the operation 3310. As can be seen, the server response embodied in the sequence of node data packets NDP1, . . . , NDPz comprises an end node service request which is recognized in the operation 3430 and performed as end node service EnServ in the operation 3435.

Figure 7D:
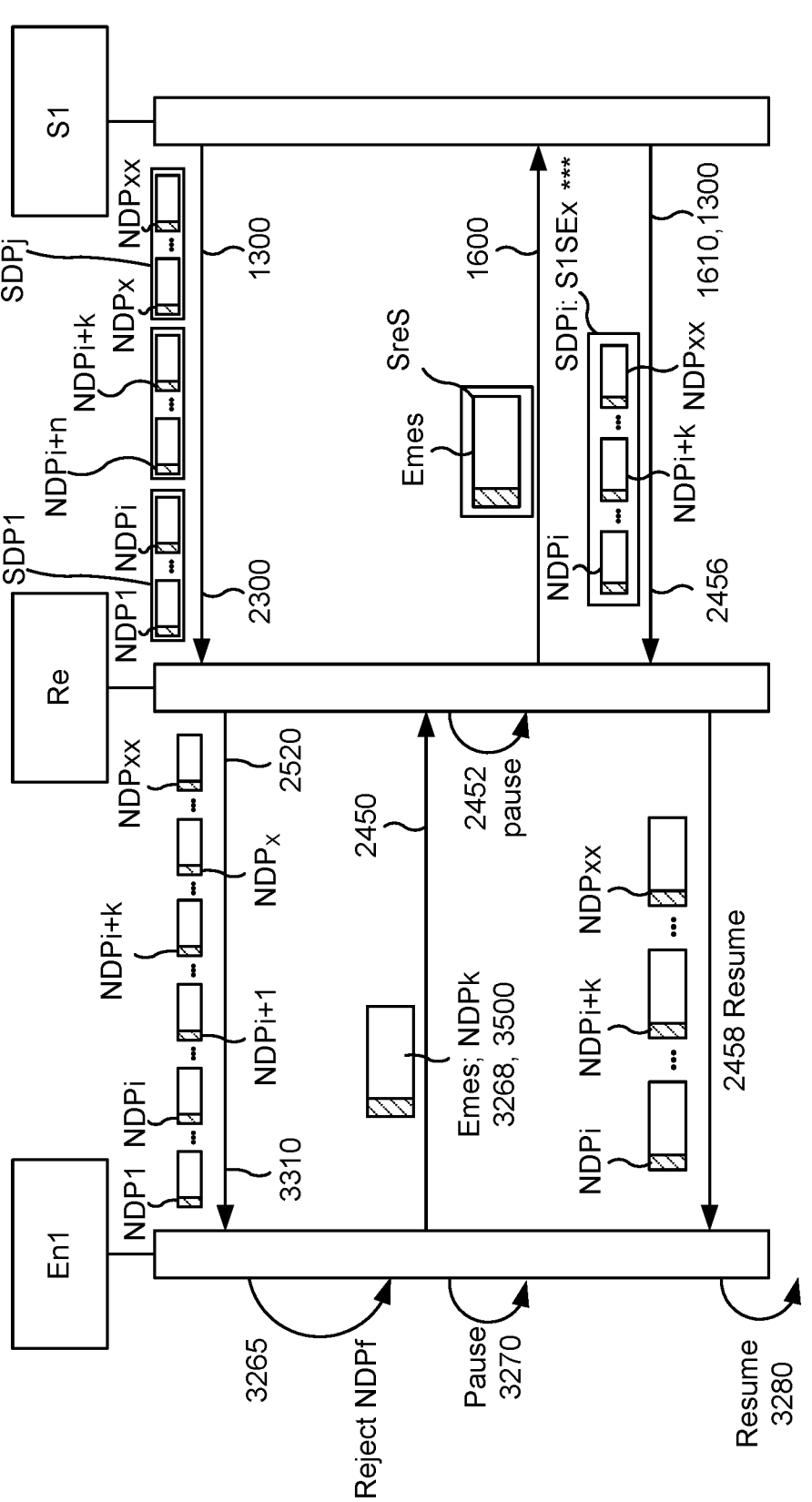
FIG. 7D illustrates an end node sending an error message end rejecting an individual NDP.

FIG. 7D illustrates a server payload SP being communicated to the end node En1 as one example of end nodes En1, . . . , Enx being selected according to the common characteristic CoC.

The server payload SP was preprocessed into the sequence of node data packets NDP1, . . . , NDPxx. The individual data node data packets NDP1, . . . , NDPxx are individually secured as indicated by the hatched portion of node data packets. The sequence was further grouped into a sequence of server data packets SDP1, . . . , SDPj, and forwarded to the relay Re in the operation 1300.

The relay Re receives the sequence of server data packets SDP1, . . . , SDPj in the operation 2300. The relay Re further forwards the sequence of node data packets NDP1, . . . , NDPxx as received within the stream of server data packets without further alterations as the sequence of node data packets NDP1, . . . , NDPxx to the end node En1 in the operation 2520.

The sequence of node data packets NDP1, . . . , NDPxx is received in the operation 3310 at the end node En1. However, one of the end node data packets NDPi is rejected in the operation 3265 after an error was detected in the operation 3105. Further, the end node transmits an error message Emes in the operations 3268 and 3500. The error message may comprise an indication that the node data packet NDPi was faulty. The error message Emes is received at the relay RE in the operation 2450. The relay Re may further pause in the operation 2452 forwarding of individual data packets in response to receiving the error message Emes.

The relay Re may perform the relay action related to the node error message or node control message of operation 2454. As part of the relay action of operation 2454, the error message Emes is grouped into special server data message, the server resend request SreS. The server resend request SreS is received as error message in the operation 1600 at the server S1.

The server may then perform the operation 1610, namely mark the sequence of node data packet starting with NDPi as a second version of the faulty node data packet NDPf and its successors. The so marked sequence of server data packets may be forwarded in the operation 1300 by the server.

The relay Re may recognize in the operation 2456 the individual server data packets send by the server S1 as a server resend delivery SreSEx. As a consequence, the relay Re may resume forwarding of individual data packets according to the operation 2458. This is illustrated for the sequence of node data packet NDPi, . . . , NDPxx. Without limitation, this may however also include a resume of relaying server data packets into the server network by the relay Re.

It is convenient for the sequence of node data packets representing the server resend delivery SreSEx to include at least one node data packet NDPi indicating the server resend delivery on node data packet level. The relay Re may introduce such node data packets NDPi into the stream of node data packets representing the server resend delivery SreSEx.

This way the end node En1 may recognize the server resend delivery SreSEX in an operation 3275 of recognizing the server resend delivery SreSEX and resume communication with the relay Re at operation 3280. It may be convenient to send the server resend delivery SreSEx on a node data packet level as a control message or with a high enough priority that it will be recognized even if the transmission and reception of node data packets is being paused.

In the following further aspects of the present disclosure are given:

The server, which may comprise one or more memories and one or more processors communicatively coupled to the one or more memories, according to a first aspect may participate in a server type network SN and may be configured to preprocess a server payload SP for communication to one or more in-vehicle network end nodes En1, . . . , Enx. The server payload SP may be preprocessed into a sequence of end node data packets NDP1, . . . , NDPy of an end node packet size EnP, wherein the one or more in-vehicle network end nodes En1, . . . , Enx are selected according to at least one common characteristic CoC. The server may communicate the server payload SP to the one or more in-vehicle network end nodes En1, . . . , Enx via at least one relay Re, wherein the in-vehicle network end nodes En1, . . . , Enx are couplable to the at least one relay Re via a first in-vehicle network type IVN different to the server network type SN, the server type network SN communicatively coupling the at least one relay Re with the server S1; wherein the server payload SP is communicated to the at least one relay Re as a sequence of server data packets SDP1, . . . , SDPm, wherein an individual server data packet SDPi out of the sequence of server data packets SDP1, . . . , SDPm-comprises a number of end node data packets NDP1, . . . , NDPn out of the sequence of end node data packets NDP1, . . . , NDPy in line with a server packet size.

In a second aspect the server S1 according to the first aspect, wherein the at least one common characteristic CoC valid for the one or more in-vehicle network end nodes (En1, . . . , Enx); is at least one of an in-vehicle network type, an end node packet size, an end node functionality, a hardware accelerator element, an operational state of the one or more in-vehicle network end nodes En1, . . . , Enx, or an operational state of a vehicle.

In a third aspect of the server S1 according to the first aspect or the second aspect, wherein the in-vehicle network end nodes En1, . . . , Enx to which the server S1 communicates the server payload SP, are located across multiple vehicles.

In a fourth aspect of the server S1 according to any one of first to third aspect, the server S1 is configured to attach a server freshness value SFV to individual ones of the server data packets SDPi within the sequence of server data packets SDP1, . . . , SDPm, wherein the individual ones of server data packets SDPi are selected according to an i modulus k operation with k<m and i, m, and k integer numbers; and an individual server freshness value SFV between subsequent ones of the individual server data packets SDPi, which are attached a server freshness value SFV differs by a freshness value increment SFinc.

In a fifth aspect the server (S1) according to any of the proceeding, aspects is configured to attach a server freshness value SFV to each of the server data packets SDPi within the sequence of server data packets SDP1, . . . , SDPm, the server freshness value SFV between subsequent ones of the server data packets SDP1, . . . , SDPm differs by a server freshness value increment SFinc.

In a sixth aspect the server according to any of the proceeding aspects, the server is configured to attach an end node freshness value NFV to individual ones of the end node data packets NDPi within the sequence of end node data packets NDP1, . . . , NDPy, wherein the individual ones of the end node data packets NDPi are selected according to an i modulus k operation with k<n, and i, k and n integer numbers, wherein an individual end node freshness value iNFV between subsequent ones of the individual end node data packets NDPi which are attached an end node freshness value NFV within the sequence of end node data packets NDP1, . . . , NDPn differs by an end node freshness value increment NFinc.

In a seventh aspect, according to any of the proceeding aspects, the server S1 is configured to attach an end node freshness value NFV of the end node data packets NDPi within the sequence of end node data packets NDP1, . . . , NDPn, wherein an individual end node freshness value NFV between subsequent ones of the individual end node data packets NDPi which are attached an end node freshness value NFV within the sequence of end node data packets NDP1, . . . , NDPn differs by an end node freshness value increment NFinc.

The server S1 in an eighth aspect according to any of the preceding aspects, wherein the server S1 is configured to attach a server freshness value SFV to individual ones of server data packets SDPi within the sequence of server data packets SDP1, . . . SDPm according to a server freshness value range SFVrange and a server freshness value increment SFVinc, the server freshness value increment SFVinc and the server freshness value range SFVrange negotiated between the server S1 and the at least one relay Re.

The server S1 in a ninth aspect according to any of the preceding aspects is configured to poll an end node freshness value range NFVrange and an end node freshness value increment NFVinc from the one or more in-vehicle network end nodes En1, . . . , Enx), and set an end node freshness start value NFVstart for the communication of the server payload SP to the one or more in-vehicle network end nodes En1, . . . , Enx.

The server S1 in a tenth aspect according to any of the preceding aspects, wherein the server S1 is further configured to secure the sequence of server data packets SDP1, . . . , SDPm using a first secret S1Re or a key KIS1Re derived from the first secret S1Re, wherein the sequence of server data packets SDP1, . . . , SDPm is either authenticated only or authenticated and encrypted, wherein the first secret S1Re or the key KIS1Re derived from the first secret S1Re) is known to the server S1 and the at least one relay (Re) only.

The server S1 in an eleventh aspect according to any of the preceding aspects, configured to secure the sequence of in-vehicle end node data packets NDP1, . . . , NDPm using a first secret EnS or a key K1EnS derived from the first secret ENS, wherein the sequence of end node data packets NDP1, . . . , NDPy is either authenticated only or authenticated and encrypted, wherein the first secret ENS or the key K1ENS is only known to the server S1 and the one or more in-vehicle network end nodes En1, . . . , Enx only.

In a twelfth aspect according of the server according to any of the preceding aspects, the server is S1 configured to make service related information ServInf available to one or more nodes En1, . . . , Enx as the server payload SP being communicated to the one or more end nodes En1, . . . , Enx.

In a thirteenth aspect of the server according to any of the preceding aspects, the server S1 is further configured: —to pause transmission of the server payload SP to the one or more in-vehicle network end nodes En1, . . . , Enx in response to receiving a server resend request SreS.

In a fourteenth aspect of the server according to any of the preceding aspects, the server resend request (SreS) comprises a node error message Emes from the one or more in-vehicle network end nodes En1, . . . , Enx indicating an error with at least one faulty end node data package NDPf.

In a fifteenth aspect of the server according to any of the preceding aspects, the server (S1) configured to identify a server request (EnS1Req) from the one or more in-vehicle network end nodes En1, . . . , Enx; —perform at least one server task (S1Task) related to the server request (EnS1Req); and communicate a response to the at least one server task (S1Task) as server payload (SP) to at least one of the one or more in-vehicle end nodes (En1, . . . , Enx).

In a first aspect of a method 100 for communicating a server payload SP from the server S1 to one or more in-vehicle end nodes En1, . . . , Enx, the method comprising: selecting (1000) one or more in-vehicle end nodes (En1, . . . , Enx) according to at least one common characteristic (CoC), wherein the one or more in-vehicle end nodes (En1, . . . , Enx) are couplable to at least one relay (Re) via a first in-vehicle network type (IVN), the in-vehicle network type (IVN) being different from a server type network (SN) communicatively coupling the server (S1) to the relay (Re); preprocessing (1100) the server payload (SP) into a sequence of end node data packets (NDP1, . . . , NDPy) of an end node packet size (EnP), such that the end node data packets are usable within the in-vehicle network; packing (1200) the preprocessed server payload (SP) as a sequence of server data packets (SDP1, . . . , SDPm), wherein an individual server data packet (SDPi) out of the sequence of server data packets (SDP1, . . . , SDPm) comprises a number of subsequent end node data packets (NDP1, . . . , NDPn) out of the sequence of end node data packets (NDP1, . . . , NDPy), the number of subsequent end node data packets (NDP1, . . . , NDPn) being in line with the server packet size; and communicating (1300) the sequence of server data packets (SDP1, . . . , SDPm) to the relay (Re).

In a second aspect of the method 100 according to the first aspect of the method 100, wherein the operation of selecting 1000 comprises the at least one common characteristic CoC is at least one of an in-vehicle network type, an end node packet size EnP, an end node functionality, a hardware accelerator element present within or an operational state of the one or more-in-vehicle network end nodes En1, . . . , Enx, the one or more in-vehicle network end nodes En1, . . . , Enx participating in a secure zone of the in-vehicle network, an operational state of the one or more in-vehicle network end nodes En1, . . . , Enx or an operational state of a vehicle.

A third aspect of the method 100 according to any of the preceding aspects of the method 100, wherein the operation of selecting 1000 comprises selecting the in-vehicle end nodes En1, . . . , Enx across more than one vehicle.

A fourth aspect of the method 100 according to any of the preceding aspects of the method 100, wherein the operation of preprocessing 1100 comprises: establishing 1120 a first secret EnS or a key K1EnS derived from the first secret EnS; and securing the sequence of end node data packets NDP1, . . . , NDPy according to an authenticating only 1140 or an authenticating and encrypting 1145.

A fifth aspect of the method 100 according to any of the preceding aspects of the method 100, wherein the operation of preprocessing 1100 further comprises: flagging 1110 selected end node data packets NDPi, . . . , NDPk, wherein for the flagged end node packets NDPi, . . . , NDPk, the flagging 1110 indicates at least one of a priority over other end node data packets, a fixed latency between the flagged end node packets NDPi, . . . , NDPk, the flagged end node data packets NDPi, . . . , NDPj to be communicated peer to peer between individual vehicles.

A sixth aspect of the method 100 according to any of the preceding aspects of the method 100, wherein the operation of preprocessing (1100) further comprises: establishing 1130 a freshness value framework between the one or more in-vehicle end nodes En1, . . . , Enx and the server S1, the freshness value framework comprising a freshness value range FVrange, a freshness start value FVstart, and a freshness value increment FVinc, wherein freshness value capabilities of the one or more in-vehicle end nodes En1, . . . , Enx have priority over freshness value capabilities of the server S1.

A seventh aspect of the method 100 according to any of the preceding aspects of the method 100, wherein the operation of packing 1200 comprises: establishing 1220 a first secret S1Re or a key KIS1Re derived from the first secret S1Re; and securing the sequence of server data packets SDP1, . . . , SDPy according to an authenticating only 1240 or an authenticating and encrypting 1245.

A eighths aspect of the method 100 according to any of the preceding aspects of the method 100, wherein the operation of packing (1200) further comprises: flagging 1210 selected server data packets SDPi, . . . , SDPk, wherein for the flagged server data packets SDPi, . . . , SDPk, the flagging (1210) indicates at least one of a priority over other server data packets, a fixed latency between the flagged server data packets SDPi, . . . , SDPk, or the flagged server data packets SDPi, . . . , SDPj to be communicated peer to peer between individual vehicles.

A ninth aspect of the method 100 according to any of the preceding aspects of the method 100, wherein within the flagging 1210 operation, a given server data packet SDPi will be flagged, if it comprises at least one flagged end node data packet NDPi, . . . , NDPk.

A tenth aspect of the method 100 according to any of the preceding aspects of the method 100, wherein the operation of packing 1200 further comprises: establishing 1230 a freshness value framework between at least one relay Re and the server S1, the freshness value framework comprising a freshness value range FVrange, a freshness start value FVstart, and a freshness value increment FVinc.

In a first aspect of a relay Re may comprise one or more memories and one or more processors communicatively coupled to the one or more memories, the relay Re is configured to: be couplable to a server (S1) participating in a server network type SN; be couplable to an in-vehicle network of an in-vehicle network type IVN different from the server network type SN, and one or more in-vehicle network end nodes En1, . . . , Enx participating in the in-vehicle network IVN and communicatively couplable to the relay Re; and receive a sequence of server data packets SDP1, . . . , SDPm from the server S1, wherein an individual one of the server data packets SDPi of the sequence of server data packets SDP1, . . . , SDPm comprises a number of end node data packets NDP1, . . . , NDPn, the number of end node data packets NDP1, . . . , NDPn being usable within the in-vehicle network; wherein the end node data packets NDP1, . . . , NDPn are of an end node packet size EnP smaller than a server data packet payload S1P; and forward the number of end node data packets NDP1, . . . , NDPn to the in-vehicle network.

In a second aspect of the relay Re according to the first aspect of the relay Re, the relay Re is configured to: receive one or more node data packets NDPj, . . . , NDPk from the in-vehicle network; group the one or more received node data packets NDPj, . . . , NDPk into individual server data packets SDPi of a sequence of server data packets SDP1, . . . , SDPm; and forward the sequence of server data packets (SDP1, . . . , SDPm) to the server network.

In a third aspect of the relay Re according to any of the preceding aspects of the relay Re, the relay Re further configured to group the one or more received node data packets NDPj, . . . , NDPk into individual server data packets SDPi such that node data packets NDPj, . . . , NDPk within the individual server data packet SDPi are intended for forwarding to one server within the server network.

In a fourth aspect of the relay Re according to any of the preceding aspects of the relay Re, the relay Re further configured to: recognize a node error message NEmes or a node control message NEmes within the received one or more node data packets NDPj, . . . , NDPk; and recognize server error message or a server control message within individual server data packets SDPs within the sequence of received server data packets SDP1, . . . , SDPm.

In a fifth aspect of the relay Re according to any of the preceding aspects of the relay Re, the relay Re further configured to: recognize a node error message NEmes from the one or more in-vehicle network end nodes En1, . . . , Enx indicating an error with at least one faulty end node data package NDPf; and transmit a server resend request SreS to the server network, the server resend request SreS including the node error message NEmes.

In a sixth aspect of the relay Re according to any of the preceding aspects of the relay Re further configured to to pause forwarding the number of in-vehicle network packets NDP1, . . . , NDPn to the one or more in-vehicle network end nodes En1, . . . , Enx in response to receiving an end node error message NEmes or an end node control message NCm.

In a seventh aspect of the relay Re according to any of the preceding aspects of the relay Re further configured to: identify an individual server data packet SDPi as a server resend delivery SreSEx; and resume forwarding end node packets NDP1, . . . , NDPn within the individual server data packets SDPi to the one or more in-vehicle network end nodes En1, . . . , Enx.

A first aspect of a method 200 of relaying, the method comprising: coupling 2100 to a server network; coupling 2200 to an in-vehicle network IVN; receiving 2300 one or more server data packets SDP1, . . . , SDPm, an individual one of the server data packets SDPi comprising a number of end node data packets NDP1, . . . , NDPn, the number of end node data packets NDP1, . . . , NDPn being usable within the in-vehicle network, wherein the end node data packets NDP1, . . . , NDPn are of an end node packet size EnP smaller than a server data packet payload S1P; and forwarding 2520 individual node data packets NDP1, . . . , NDPn as received within the received one or more server data packet SDP1, . . . , SDPm to the in-vehicle network.

A second aspect of the method 200 according to the first aspect of the method 200, the method 200 comprising: receiving 2400 NDPs from the in-vehicle network IVN, and grouping 2480 the received NDPs into a sequence of server data packets SDP1, . . . , SDPn; and forwarding 2550 the sequence of server data packets SDP1, . . . , SDPn to the server network.

A third aspect of the method 200 according to any of the preceding aspects of the method 200, the method 200 comprising: recognizing 2350 a server error message SEm or a server control message SCm; or recognizing 2450 an end node error message NEmes or an end node control message NCm; and pausing 2452 forwarding node data packets NDPi to the in-vehicle network.

A fourth aspect of the method 200 according to any of the preceding aspects of the method 200, the method 200 comprising: pausing 2352 forwarding of server data packets SDPi to the server network in response to recognizing 2350 a server error message SEm or a server control message SCm; or recognizing 2450 an end node error message NEm or an end node control message NCm.

A fifth aspect of the method 200 according to any of the preceding aspects of the method 200, the method 200 comprising: transmitting 2454 a server resend request SreS, the server resend request including the end node error message NEm and/or the end node control message NCm.

A first aspect of an in-vehicle end node En1, which may comprise one or more memories and one or more processors communicatively coupled to the one or more memories, configured to: participate in an in-vehicle network (IVN) of a vehicle, establish a secret (Sec), between the in-vehicle end node (En1) and a server (S1), the server being external to the vehicle and forming part of a server network, the server network being of a server network type different to the in-vehicle network (IVN), wherein the server (S1) is communicatively coupled to the in-vehicle end node (En1) via at least one relay (Re), the at least one relay (Re) communicatively couplable to the server (S1) and further participating in the in-vehicle network (IVN); establish a secured end-to-end communication between the in-vehicle end node (En1) and the server (S1) using the secret (Sec) or a first key (K1Sec) derived from the secret (Sec); communicate one or more end node data packets (NDP1, . . . , NDPy) of an end node packet size (EnP) via the secured end-to-end communication to the server (S1).

A second aspect of the in-vehicle end node En according to the first aspect, the in-vehicle end node En1 configured to: set a freshness value FV and a maximum value max V for the secured end-to-end communication between the in-vehicle end node En1 and the server S1; and interrupt any further communication via the secured end-to-end communication, using the secret Sec or the first key K1Sec derived from the secret Sec, if the freshness value FV reaches the maximum value (maxV).

A third aspect of the in-vehicle end node En1 according to any of the aspects of the end node En1, wherein the in-vehicle network in which the in-vehicle end node (En1) participates, is a bus-based multi-drop communication network.

A fourth aspect of the in-vehicle end node En1 according to any of the aspects of the end node En1, wherein the in-vehicle network is implemented as a CAN network, a CAN FD network, a CAN XL network, a10Base-T1S network, a 10Base-T1L network, or a FlexRay network.

A fifth aspect of the in-vehicle end node En1 according to any of the aspects of the end node En1, further configured to: process end node data packets NDP with a node payload size N1$p$, while the server S1 is configured to process server data packets SDP with a server payload size S1$p$, the server payload size S1$p$ being larger than the node payload size N1$p$.

A sixth aspect of the in-vehicle end node En1 according to any of the aspects of the end node En1, further configured to: use the first key K1Sec to secure one or more of node data packets NDPs securely communicated between the in-vehicle end node En1 and the server S1.

A seventh aspect of the in-vehicle end node En1 according to any of the aspects of the end node En1, further configured to: increment a freshness value from a given end node data packet NDP to a subsequent node end node packet NDP' by a freshness increment FVinc.

An eighth aspect of the in-vehicle end node En1 according to any of the aspects of the end node En1, wherein end node data packets NDP communicated via the secured end-to-end communication are secured by authentication only or authentication and encryption.

A ninth aspect of the in-vehicle end node En1 according to any of the aspects of the end node En1, further configured to terminate the secured end-to-end communication with the server S1 upon the freshness value FV reaching the maximum value max V.

A tenth aspect of the in-vehicle end node En1 according to any of the aspects of the end node En1, further configured to issue a warning, if the freshness value FV reaches the maximum value maxV or is a margin from reaching the maximum value max V.

An eleventh aspect of the in-vehicle end node En1 according to any of the aspects of the end node En1, further configured to: derive a further key (K*Sec) from the secret (Sec) after the freshness value (FV) has reached the maximum value (max V) or the freshness value is a margin away from reaching the maximum value (maxV); reset the freshness value (FV) to a reset value (resetV) smaller than a maximum value (maxV); resume the secured end to end communication between the in-vehicle end node (En1) and the server (S1) using the further key (K*Sec).

A twelfth aspect of the in-vehicle end node En1 according to any of the aspects of the end node En1, further configured to: set the freshness value FV to a reset value resetV smaller than the maximum value max V after the freshness value FV has reached the maximum value max V or is a margin away from the maximum value max V; trigger establishment of a new secret Sec*, the new secret Sec* being known to the in-vehicle end node En1 and the server S1 only; and resume secured end to end communication between the in-vehicle end node En1 and the server S1 using the new secret Sec* to secure end node data packets NDP communicated between the in-vehicle end node En1 and the server S1.

A thirteenth aspect of the in-vehicle end node En1 according to any of the aspects of the end node En1, further configured to: receive an end node service request (1EnReq from the server S1 via the at least one relay Re; and further configured to perform an end node service EnServ in response to the received end node service request S1EnReq.

A fourteenth aspect of the in-vehicle end node En1 according to any of the aspects of the end node En1, wherein the end node service (EnServ) is at least one of measuring one or more physical quantities, polling one or more functional parameters related to an operational state of at least a subsystem of the vehicle, storing critical events for one or more subsystems within the vehicle, and communicating any combination of the physical quantities, the functional parameters, and the critical events to the server S1 as a sequence of end node data packets NDP1, . . . , NDPj via the at least one relay Re.

A fourteenth aspect of the in-vehicle end node En1 according to any of the aspects of the end node En1, wherein the end node service EnServ is at least one of adjusting one or more operational parameters of a subsystem within the vehicle, and adjusting one or more operational parameters within the vehicle.

A fifteenth aspect of the in-vehicle end node En1 according to any of the aspects of the end node En1, the end node En1 configured to send a server request EnS1Req to the server S1, and further configured to adjust one or more operational parameters of a subsystem within the vehicle or the vehicle in response to a server response S1SerRes from the server S1.

A sixteenth aspect of the in-vehicle end node En1 according to any of the aspects of the end node En1, the in-vehicle end node En1 configured to reject an individual end node data packet NDPi should the in-vehicle end node En1 recognize one or more of a mismatch in freshness value FV, an unsuccessful authentication, and an unsuccessful authentication and decryption.

A fourteenth aspect of the in-vehicle end node En1 according to any of the aspects of the end node En1, further configured to trigger a new freshness value FV and freshness value range between the in-vehicle end node En1 and the relay Re or between the in-vehicle end node En1 and the server S1.

A first aspect of a method 300 of operating an in-vehicle end node (En1), the method comprising: coupling 3100 the in-vehicle end node En1 to an in-vehicle network IVN; establishing 3210 a secret Sec between the in-vehicle end node En1 and a server S1, the server S1 being external to the vehicle and participating in a server network of a different type than the in-vehicle network IVN; establishing 3200 a secured end-to-end communication between the in-vehicle end node En1 and the server S1; transmitting 3500 one or more end node data packets NDP1, . . . , NDPy of an end node packet size EnP via the secured end-to-end communication to the server S1 via a relay Re.

A second aspect of the method 300 of operating an in-vehicle end node En1 according to the first aspect of the method 300, the operation of establishing 3210 a secret Sec further comprising: receiving 3210$b$ a request to establish a secret Sec, or requesting 3210$c$ a secret Sec and receiving a secret Sec.

A third aspect of the method 300 of operating an in-vehicle end node En1 according to any of the preceding aspects of the method 300, wherein the operation of establishing 3200 comprises: using the secret (Sec) or a first key (K1Sec) derived from the secret (Sec).

A fourth aspect of the method 300 of operating an in-vehicle end node En1 according to any of the preceding aspects of the method 300, the establishing 3200 comprising: authenticating only 3250, or authenticating and encrypting (3255).

A fifth aspect of the method 300 of operating an in-vehicle end node En1 according to any of the preceding aspects of the method 300, the establishing (3200) further comprising: establishing (3260) a freshness value scheme.

A sixth aspect of the method 300 of operating an in-vehicle end node En1 according to any of the preceding aspects of the method 300, further comprising: requesting 3600 a service from the server S1.

A seventh aspect of the method 300 of operating an in-vehicle end node En1 according to any of the preceding aspects of the method 300, the method further comprising: receiving 3510 securely one or more node data packets NDP1, . . . , NDPm; inspecting (3105) the securely received node data packets (NDP1, . . . , NDPm)) with regards to errors; and marking node data packets comprising any error as faulty node data packets (NDPf); rejecting (3265) the faulty node data packet (NDPf).

An eighth aspect of the method 300 of operating an in-vehicle end node En1 according to any of the preceding aspects of the method 300, the method comprising: identifying 3261 a security error with the establishing 3200.

A ninth aspect of the method 300 of operating an in-vehicle end node En1 according to any of the preceding aspects of the method 300, the method comprising, if no error is identified in the inspecting 3105: recognizing 3430 an end node service request S1EnReq, and performing 3435 an end node service related to the end node service request S1EnReq, or applying 3450 the securely received node data packets NDP1, . . . , NDPm to the end node En1.

A first aspect of a device M, which may comprise one or more memories and one or more processors communicatively coupled to the one or more memories, for controlling a server S1, the device configured to couple to the server S1 within a server network; cause the server S1 to preprocess a server payload SP into a sequence of node data packets NDP1, . . . , NDPy of an end node packet size EnP; and cause the server S1 to communicate the server payload SP to the one or more in-vehicle end nodes En1, . . . , Enx via at least one relay Re, wherein the server payload SP is communicated to the at least one relay (Re) as a sequence of server data packets SDP1, . . . , SDPm, wherein an individual server data packet SDPi out of the sequence of server data packets SDP1, . . . , SDPm comprises a number of end node data packets NDP1, . . . , NDPn out of the sequence of end node data packets NDP1, . . . , NDPy, the number of end node data packets NDP1, . . . , NDPn in line with a server packet size; and wherein the one or more in-vehicle end nodes En1, . . . , Enx are couplable to the relay Re via an in-vehicle network IVN in which the relay Re participates, wherein the node data packets NDP1, . . . , NDPy may be directly communicated within the in-vehicle network IVN.

A second aspect of the device M according to the first aspect, further configured to: cause the server S1 to select the one or more in-vehicle end nodes En1, . . . , Enx according to a common characteristic CoC.

A third aspect of the device M according to any of the preceding aspects of the device M, further configured to: cause the server S1 to communicate a server end node request S1EnReq to the one or more in-vehicle network end nodes En1, . . . , Enx, and signal successful delivery of the server end node request S1EnReq and/or successful completion of an end node service EnServ associated with the end node service request S1EnReq.

A fourth aspect of a method 300 of operating an in-vehicle end node En1 according to any of the preceding aspects of the method 300, further configured to: cause the server S1 to perform a server task S1Task; communicate a result of the server task S1Task to the one or more in-vehicle end nodes En1, . . . , Enx; and signal successful performance of the server task S1Task and/or successful communication of the result to the one or more in-vehicle end nodes En1, . . . , Enx.

A first aspect of a method 400 of controlling a server S1, the method 400 comprising: coupling 4050 a device M to the server S; cause the server preprocessing 4100 a server payload SP into a sequence of node data packets NDP1, . . . , NDPy of an end node data packet size; causing the server S1 packing 4200 the preprocessed server payload SP as a sequence of server data packets SDP1, . . . , SDPm, wherein an individual server data packet SDPi out of the sequence of server data packets SDP1, . . . , SDPm comprises a number of subsequent end node data packets NDP1, . . . , NDPn out of the sequence of end node data packets NDP1, . . . , NDPy, the number of subsequent end node data packets NDP1, . . . , NDPn being in line with the server packet size; and causing the server S1 communicating 4300 the sequence of server data packets SDP1, . . . , SDPm to the relay (Re).

A second aspect of the method 400 of controlling a server S1 according to the first aspect, the method 400 comprising: causing the server S1 selecting 4070 one or more in-vehicle end nodes En1, . . . , Enx according to a common characteristic CoC.

A third aspect of the method 400 according to any preceding aspects of the method 400, the method 400 comprising: causing the server S1 communicating 4500 a server end node request S1EnReq to the one or more in-vehicle end nodes En1, . . . , Enx, and signaling 4550 successful delivery of the server end node request S1EnReq and/or successful completion of an end node service EnServ associated with the end node service request S1EnReq.

A fourth aspect of the method 400 according to any preceding aspects of the method 400, the method 400 comprising: causing the server S1 performing 4600 a server task S1Task; causing the server S1 communicating 4700 a result of the server task S1Task to the one or more in-vehicle end nodes En1, . . . , Enx as the server payload SP; and signaling 4750 successful performance of the server task S1Task and/or successful communication of the result to the one or more in-vehicle end nodes En1, . . . , Enx.

The foregoing disclosure provides illustration and description, but is not intended to be exhaustive or to limit the implementations to the precise forms disclosed. Modifications and variations may be made in light of the above disclosure or may be acquired from practice of the implementations.

It will be apparent that the various devices, systems, and/or methods described herein may be implemented in different forms of hardware, firmware, or a combination of hardware and software. For example, in some aspects, these devices, systems, and/or methods may be implemented using one or more memories and one or more processors communicatively coupled to the one or more memories. As another example, in some aspects, these devices, systems, and/or methods may be implemented using logic circuitry in addition to, or instead of, one or more memories and/or one or more processors. The actual specialized control hardware or software code used to implement the devices, systems, and/or methods is not limiting of the implementations. Thus, the operation and behavior of the devices, systems, and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items,), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An in-vehicle end node, comprising:
one or more memories; and
one or more processors, communicatively coupled to the one or more memories, configured to:
participate in an in-vehicle network of a vehicle;
establish a secret, between the in-vehicle end node and a server, the server being external to the vehicle and forming part of a server network, the server network being of a server network type different to the in-vehicle network,
wherein the server is communicatively coupled to the in-vehicle end node via at least one relay, the at least one relay communicatively couplable to the server and further participating in the in-vehicle network;

establish a secured end-to-end communication between the in-vehicle end node and the server using the secret or a first key derived from the secret; and
communicate one or more end node data packets of an end node packet size via the secured end-to-end communication to the server.

2. The in-vehicle end node of claim 1, wherein the one or more processors are further configured to:
set a freshness value and a maximum value for the secured end-to-end communication between the in-vehicle end node and the server; and
interrupt any further communication via the secured end-to-end communication, using the secret or the first key derived from the secret, if the freshness value reaches the maximum value.

3. The in-vehicle end node of claim 1, wherein the in-vehicle network in which the in-vehicle end node participates, is a bus-based multi-drop communication network.

4. The in-vehicle end node of claim 1, wherein the in-vehicle network is implemented as a CAN network, a CAN FD network, a CAN XL network, a10Base-T1S network, a 10Base-T1L network, or a FlexRay network.

5. The in-vehicle end node of claim 1, wherein the one or more processors are further configured to:
process end node data packets with a node payload size, while the server is configured to process server data packets with a server payload size, the server payload size being larger than the node payload size.

6. The in-vehicle end node of claim 1, wherein the one or more processors are further configured to:
use the first key to secure one or more of node data packets securely communicated between the in-vehicle end node and the server.

7. The in-vehicle end node of claim 1, wherein the one or more processors are further configured to:
increment a freshness value from a given end node data packet to a subsequent node end node packet by a freshness increment.

8. The in-vehicle end node of claim 1, wherein end node data packets communicated via the secured end-to-end communication are secured by authentication only or authentication and encryption.

9. The in-vehicle end node of claim 2, wherein the one or more processors are further configured to:
terminate the secured end-to-end communication with the server upon the freshness value reaching the maximum value.

10. The in-vehicle end node of claim 2, wherein the one or more processors are further configured to:
issue a warning, if the freshness value reaches the maximum value or is a margin from reaching the maximum value.

11. The in-vehicle end node of claim 2, wherein the one or more processors are further configured to:
derive a further key from the secret after the freshness value has reached the maximum value or the freshness value is a margin away from reaching the maximum value;
reset the freshness value to a reset value smaller than a maximum value; and
resume the secured end-to-end communication between the in-vehicle end node and the server using the further key.

12. The in-vehicle end node of claim 2, wherein the one or more processors are further configured to:

set the freshness value to a reset value smaller than the maximum value after the freshness value has reached the maximum value or is a margin away from the maximum value;

trigger establishment of a new secret, the new secret being known to the in-vehicle end node and the server only; and resume secured end-to-end communication between the in-vehicle end node and the server using the new secret to secure end node data packets communicated between the in-vehicle end node and the server.

13. The in-vehicle end node of claim 1, wherein the one or more processors are further configured to:

receive an end node service request from the server via the at least one relay; and perform an end node service in response to the received end node service request.

14. The in-vehicle end node of claim 13, wherein the end node service comprises at least one of:

measuring one or more physical quantities, polling one or more functional parameters related to an operational state of at least a subsystem of the vehicle, or storing critical events for one or more subsystems within the vehicle, and communicating any combination of the physical quantities, the functional parameters, and the critical events to the server as a sequence of end node data packets via the at least one relay.

15. The in-vehicle end node of claim 13, wherein the end node service is at least one of adjusting one or more operational parameters of a subsystem within the vehicle, or adjusting one or more operational parameters within the vehicle.

16. The in-vehicle end node of claim 1, wherein the one or more processors are further configured to:

send a server request to the server; and adjust one or more operational parameters of a subsystem within the vehicle or the vehicle in response to a server response from the server.

17. The in-vehicle end node of claim 1, wherein the one or more processors are further configured to:

reject an individual end node data packet should the in-vehicle end node recognize one or more of a mismatch in freshness value, an unsuccessful authentication, and an unsuccessful authentication and decryption.

18. The in-vehicle end node of claim 1, wherein the one or more processors are further configured to:

reject an individual end node data packet should the in-vehicle end node recognize one or more of a mismatch in freshness value, an unsuccessful authentication, or an unsuccessful authentication and decryption.

19. A method of operating an in-vehicle end node of a vehicle, the method comprising:

coupling the in-vehicle end node to an in-vehicle network;

establishing a secret between the in-vehicle end node and a server, the server being external to the vehicle and participating in a server network of a different type than the in-vehicle network;

establishing a secured end-to-end communication between the in-vehicle end node and the server; and transmitting one or more end node data packets of an end node packet size via the secured end-to-end communication to the server via a relay.

20. The method of claim 19, wherein establishing the secret between the in-vehicle end node and the server comprises:

receiving a request to establish a secret; or requesting a secret and receiving a secret.

21. The method of claim 19, wherein establishing the secured end-to-end communication between the in-vehicle end node and the server comprises:

using the secret or a first key derived from the secret.

22. The method of claim 19, wherein establishing the secured end-to-end communication between the in-vehicle end node and the server comprises:

authenticating only; or authenticating and encrypting.

23. The method of claim 19, wherein establishing the secured end-to-end communication between the in-vehicle end node and the server comprises:

establishing a freshness value scheme.

24. The method of claim 19, further comprising:

requesting a service from the server.

25. The method of claim 19, further comprising:

receiving securely one or more node data packets;

inspecting the one or more securely received node data packets with regards to errors;

marking node data packets comprising any error as faulty node data packets; and rejecting the faulty node data packets.

26. The method of claim 25, further comprising:

determining that an error is not identified based on inspecting the one or more securely received node data packets with regards to errors; and recognizing an end node service request, and performing an end node service related to the end node service request, or applying the securely received node data packets to the end node.

27. The method of claim 19, further comprising:

identifying a security error with the establishing.

28. A relay comprising:

one or more memories; and one or more processors, communicatively coupled to the one or more memories, configured to:

receive a sequence of server data packets from a server of a server network participating in a server network type, wherein the relay is configured to be couplable to the server, wherein the relay is configured to be couplable to an in-vehicle network of an in-vehicle network type that is different from the server network type, and one or more in-vehicle network end nodes participating in the in-vehicle network and communicatively couplable to the relay, wherein an individual one of the server data packets of the sequence of server data packets comprises a number of end node data packets, the number of end node data packets being usable within the in-vehicle network, and wherein the end node data packets are of an end node packet size smaller than a server data packet payload; and forward the number of end node data packets to the in-vehicle network.

29. The relay of claim 28, wherein the one or more processors are further configured to:

receive one or more node data packets from the in-vehicle network;

group the one or more received node data packets into individual server data packets of a sequence of server data packets; and

forward the sequence of server data packets to the server network.

30. The relay of claim 29, wherein the one or more processors are further configured to:
group the one or more received node data packets into individual server data packets such that node data packets within the individual server data packet are intended for forwarding to one server within the server network.

31. The relay of claim 29, wherein the one or more processors are further configured to:
recognize a node error message or a node control message within the received one or more node data packets; and
recognize server error message or a server control message within individual server data packets within the sequence of received server data packets.

32. The relay of claim 28, wherein the one or more processors are further configured to:
recognize a node error message from the one or more in-vehicle network end nodes indicating an error with at least one faulty end node data package; and
transmit a server resend request to the server network, the server resend request including the node error message.

33. The relay of claim 28, wherein the one or more processors are further configured to:
pause forwarding the number of in-vehicle network packets to the one or more in-vehicle network end nodes in response to receiving an end node error message or an end node control message.

34. The relay of claim 28, wherein the one or more processors are further configured to:
pause forwarding the number of in-vehicle network packets to the one or more in-vehicle network end nodes in response to receiving a server error message or a server control message.

35. The relay of claim 28, wherein the one or more processors are further configured to:
identify an individual server data packet as a server resend delivery; and
resume forwarding end node packets within the individual server data packets to the one or more in-vehicle network end nodes.

36. A method of relaying, the method comprising:
coupling to a server network;
coupling to an in-vehicle network;
receiving one or more server data packets, an individual one of the server data packets comprising a number of end node data packets, the number of end node data packets being usable within the in-vehicle network, wherein the end node data packets are of an end node packet size smaller than a server data packet payload; and
forwarding individual node data packets as received within the received one or more server data packets to the in-vehicle network.

37. The method of relaying of claim 36, further comprising:
receiving end node data packets from the in-vehicle network;
grouping the received end node data packets into a sequence of server data packets; and
forwarding the sequence of server data packets to the server network.

38. The method of relaying of claim 36, further comprising:
recognizing a server error message or a server control message; or

recognizing an end node error messages or an end node control message; and
pausing forwarding node data packets to the in-vehicle network.

39. The method of relaying of claim 36, further comprising:
pausing forwarding of server data packets to the server network in response to:
recognizing a server error message or a server control message, or
recognizing an end node error message or an end node control message.

40. The method of relaying of claim 39, further comprising:
transmitting a server resend request, the server resend request including the end node error message and/or the end node control message.

41. A device for controlling a server, the device comprising:
one or more memories; and
one or more processors, communicatively coupled to the one or more memories, configured to:
couple to the server within a server network;
cause the server to preprocess a server payload into a sequence of node data packets of an end node packet size; and
cause the server to communicate the server payload to one or more in-vehicle end nodes via at least one relay,
wherein the server payload is communicated to the at least one relay as a sequence of server data packets,
wherein an individual server data packet out of the sequence of server data packets comprises a number of end node data packets out of the sequence of end node data packets, the number of end node data packets in line with a server packet size,
wherein the one or more in-vehicle end nodes are couplable to the relay via an in-vehicle network in which the relay participates, and
wherein the node data packets are capable of being directly communicated within the in-vehicle network.

42. The device of claim 41, wherein the one or more processors are further configured to:
cause the server to select the one or more in-vehicle end nodes according to a common characteristic.

43. The device of claim 41, wherein the one or more processors are further configured to:
cause the server to communicate a server end node request to the one or more in-vehicle end nodes, and
signal successful delivery of the server end node request and/or successful completion of an end node service associated with the end node service request.

44. The device of claim 41, wherein the one or more processors are further configured to:
cause the server to perform a server task;
communicate a result of the server task to the one or more in-vehicle end nodes; and
signal successful performance of the server task and/or successful communication of the result to the one or more in-vehicle end nodes.

45. A method of controlling a server, the method comprising:

coupling a device to the server;

causing the server to preprocess a server payload into a sequence of node data packets of an end node data packet size;

causing the server to pack the preprocessed server payload as a sequence of server data packets, wherein an individual server data packet out of the sequence of server data packets comprises a number of subsequent end node data packets out of the sequence of end node data packets, the number of subsequent end node data packets being in line with a server packet size; and causing the server to communicate the sequence of server data packets to a relay.

46. The method of claim 45, further comprising:

causing the server to select one or more in-vehicle end nodes according to a common characteristic.

47. The method of claim 46, further comprising:

causing the server to communicate a server end node request to the one or more in-vehicle end nodes, and signaling successful delivery of the server end node request and/or successful completion of an end node service associated with the end node service request.

48. The method of claim 46, further comprising:

causing the server to perform a server task;

causing the server to communicate a result of the server task to the one or more in-vehicle end nodes as the server payload; and signaling successful performance of the server task and/or successful communication of the result to the one or more in-vehicle end nodes.

* * * * *